US012695885B2

(12) United States Patent
Hendry et al.

(10) Patent No.: US 12,695,885 B2
(45) Date of Patent: Jul. 28, 2026

(54) IMAGE CODING METHOD BASED ON INFORMATION RELATED TO TILE AND INFORMATION RELATED TO SLICE IN VIDEO OR IMAGE CODING SYSTEM

(71) Applicant: LG ELECTRONICS INC., Seoul (KR)

(72) Inventors: Hendry Hendry, Seoul (KR); Seethal Paluri, Seoul (KR); Seunghwan Kim, Seoul (KR); Jie Zhao, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 41 days.

(21) Appl. No.: 18/972,010

(22) Filed: Dec. 6, 2024

(65) Prior Publication Data

US 2025/0106406 A1     Mar. 27, 2025

Related U.S. Application Data

(63) Continuation of application No. 17/909,943, filed as application No. PCT/KR2021/002745 on Mar. 5, 2021, now Pat. No. 12,206,866.

(60) Provisional application No. 62/987,331, filed on Mar. 9, 2020.

(51) Int. Cl.
*H04N 19/174* (2014.01)
*H04N 19/119* (2014.01)
*H04N 19/46* (2014.01)
*H04N 19/96* (2014.01)

(52) U.S. Cl.
CPC ......... *H04N 19/174* (2014.11); *H04N 19/119* (2014.11); *H04N 19/46* (2014.11); *H04N 19/96* (2014.11)

(58) Field of Classification Search
None
See application file for complete search history.

(56) References Cited

U.S. PATENT DOCUMENTS

2022/0408114 A1* 12/2022 Deshpande .......... H04N 19/119

OTHER PUBLICATIONS

Joint Video Experts Team (JVET) of ITU-T SG 16 WP 3 and ISO/IEC JTC 1/SC 29/WG 11; JVET-P2001-vE; 16th Meeting: Geneva, CH, Oct. 1-11, 2019 (Year: 2019).*

* cited by examiner

*Primary Examiner* — Clifford Hilaire
(74) *Attorney, Agent, or Firm* — Bryan Cave Leighton Paisner LLP

(57) ABSTRACT

According to a disclosure of the present document, information/parameter related to splitting of a picture can be signaled on the basis of a no-picture partition flag, information related to a tile, and information related to a slice, unnecessary redundant signaling can be removed accordingly, and the number of bits assigned to the signaling can be reduced, thereby deriving an effect of increasing an overall coding efficiency.

15 Claims, 13 Drawing Sheets

[FIG. 1]
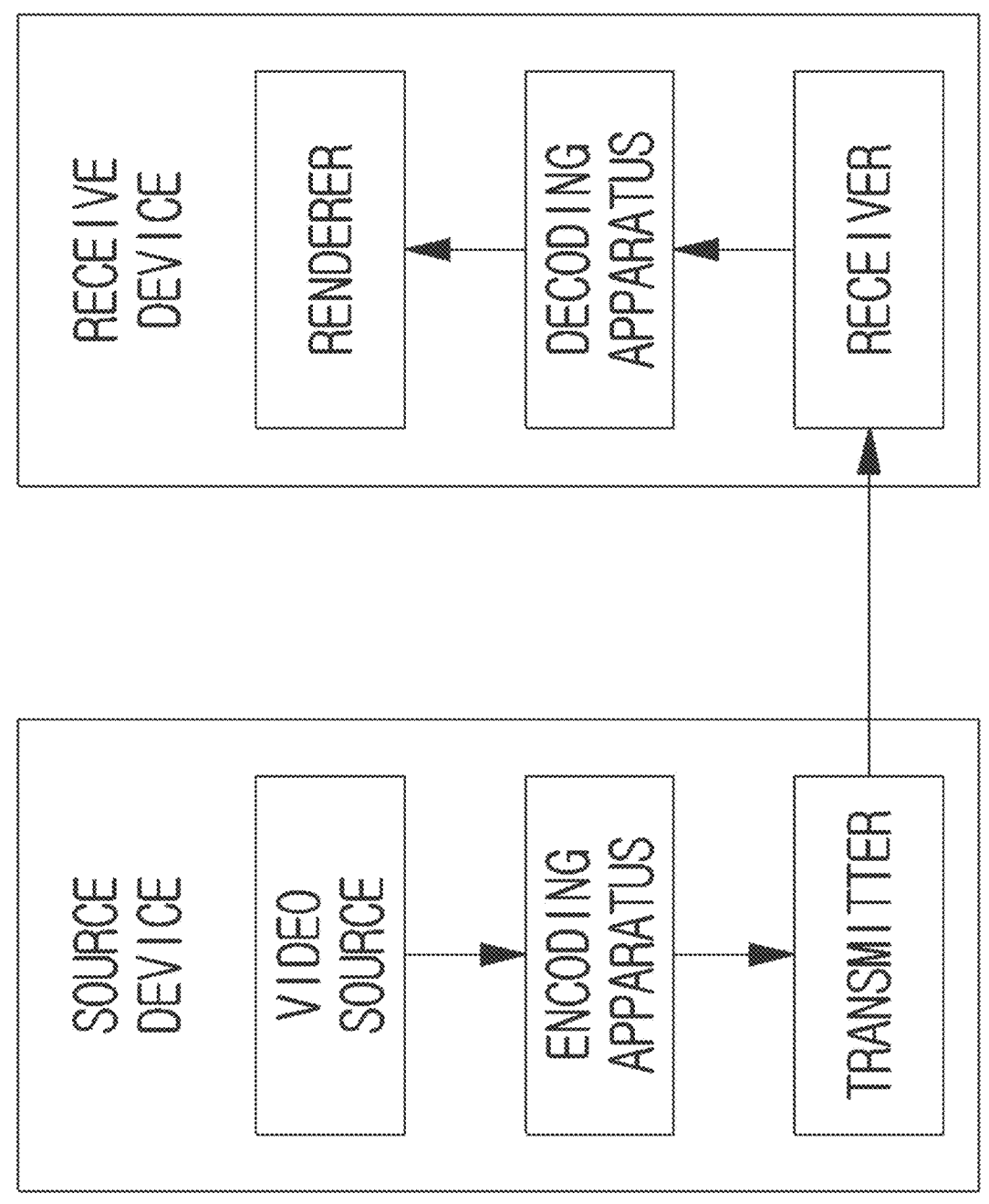

[FIG. 2]
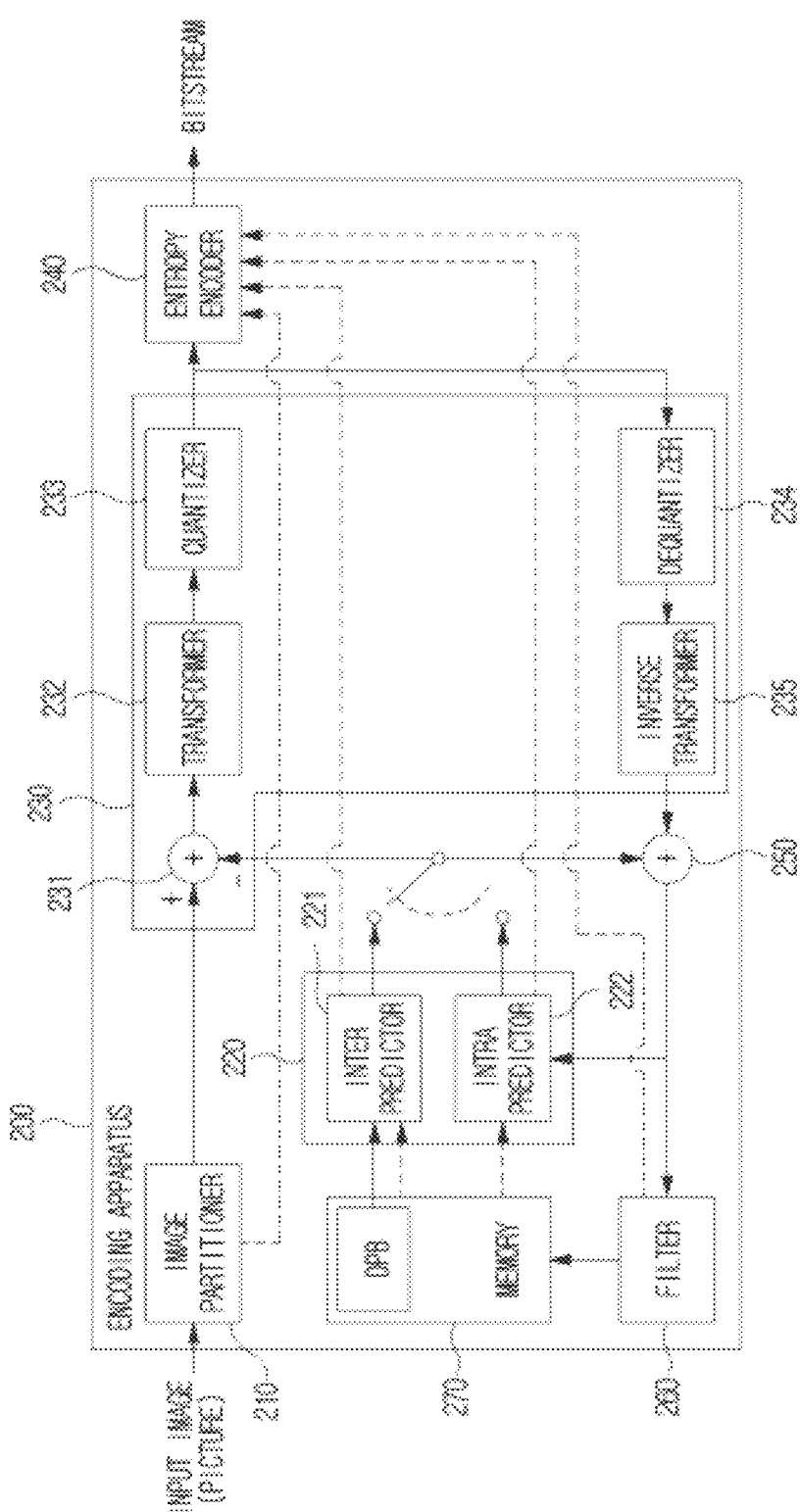

[FIG. 3]
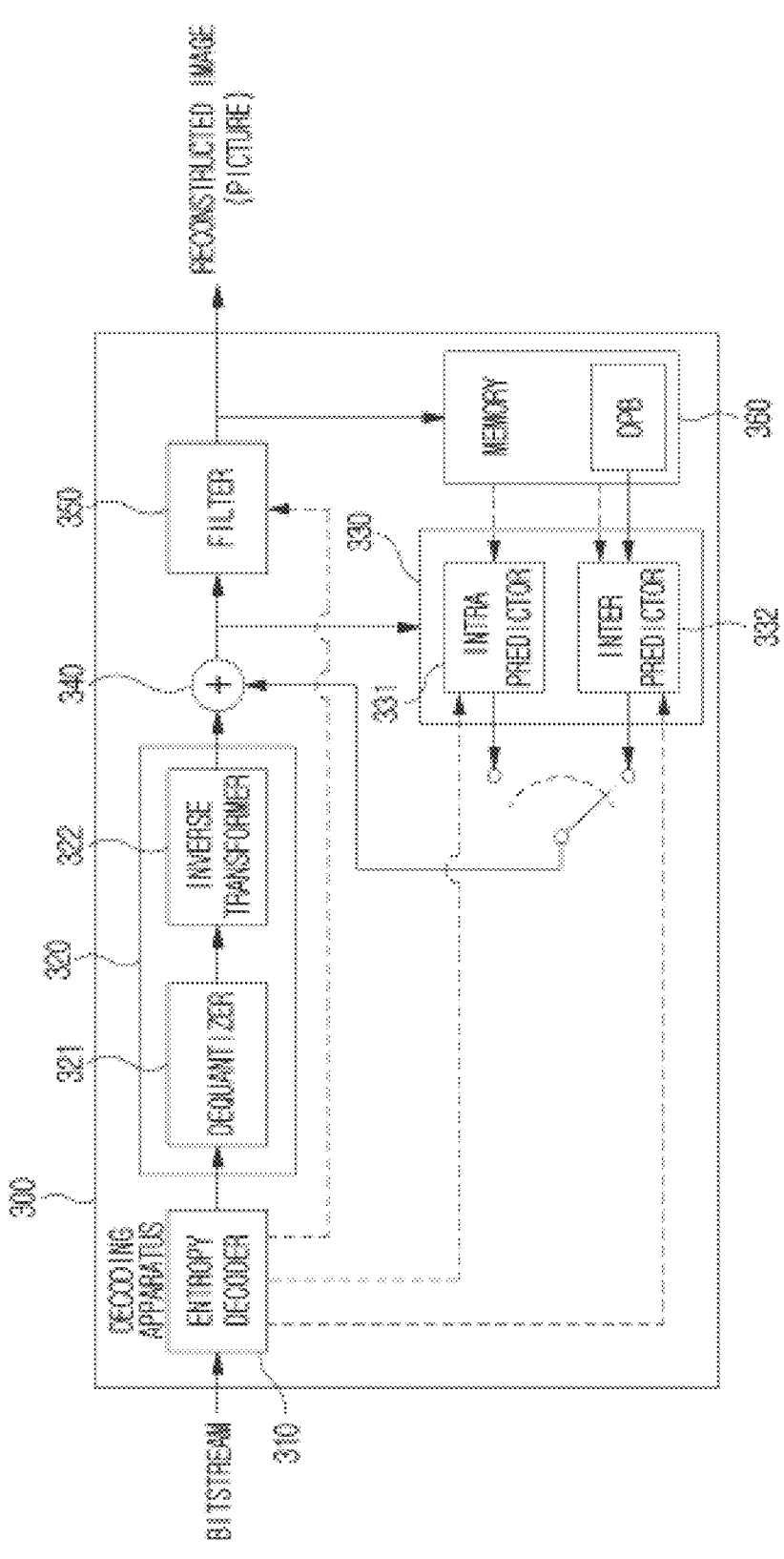

[FIG. 4]
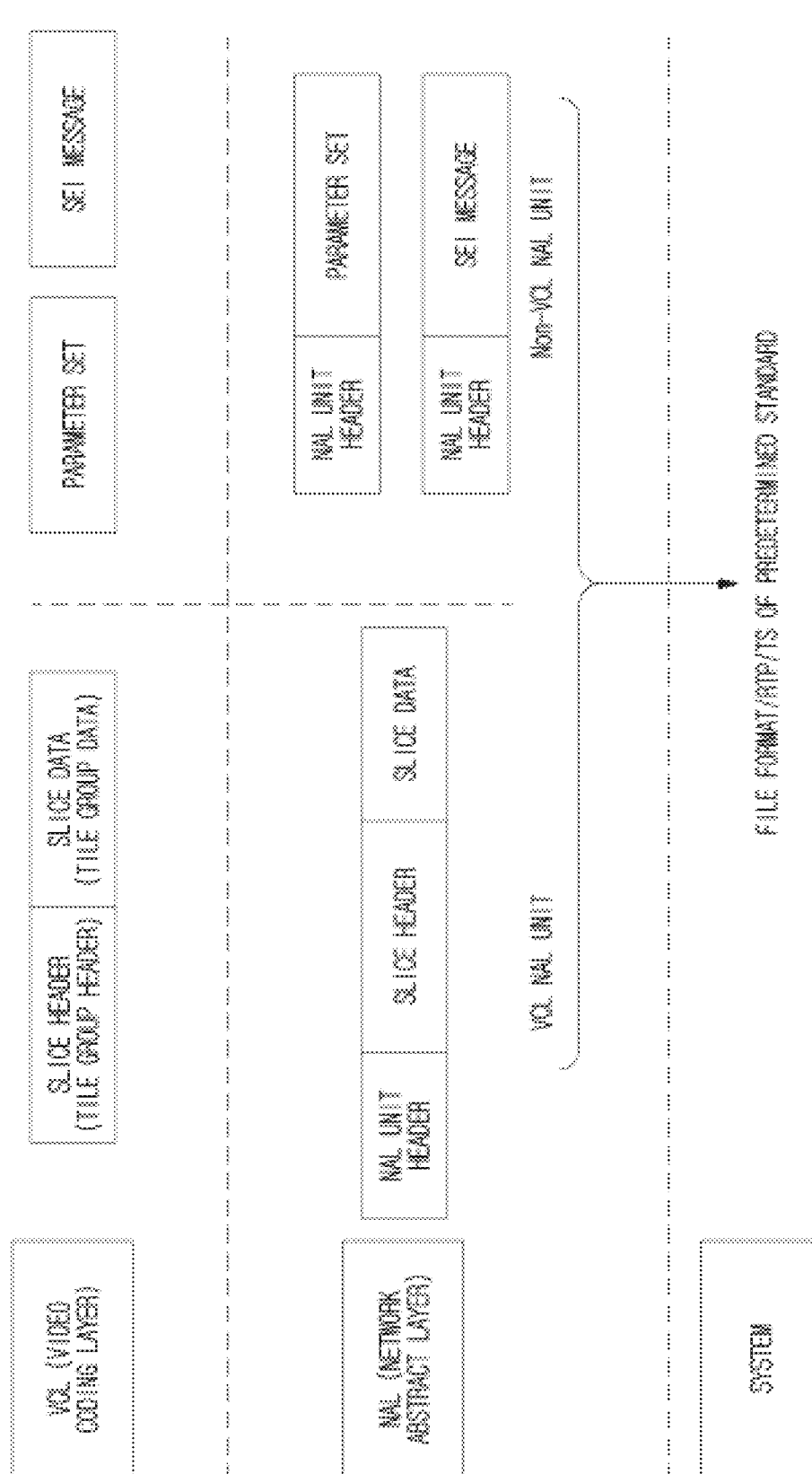

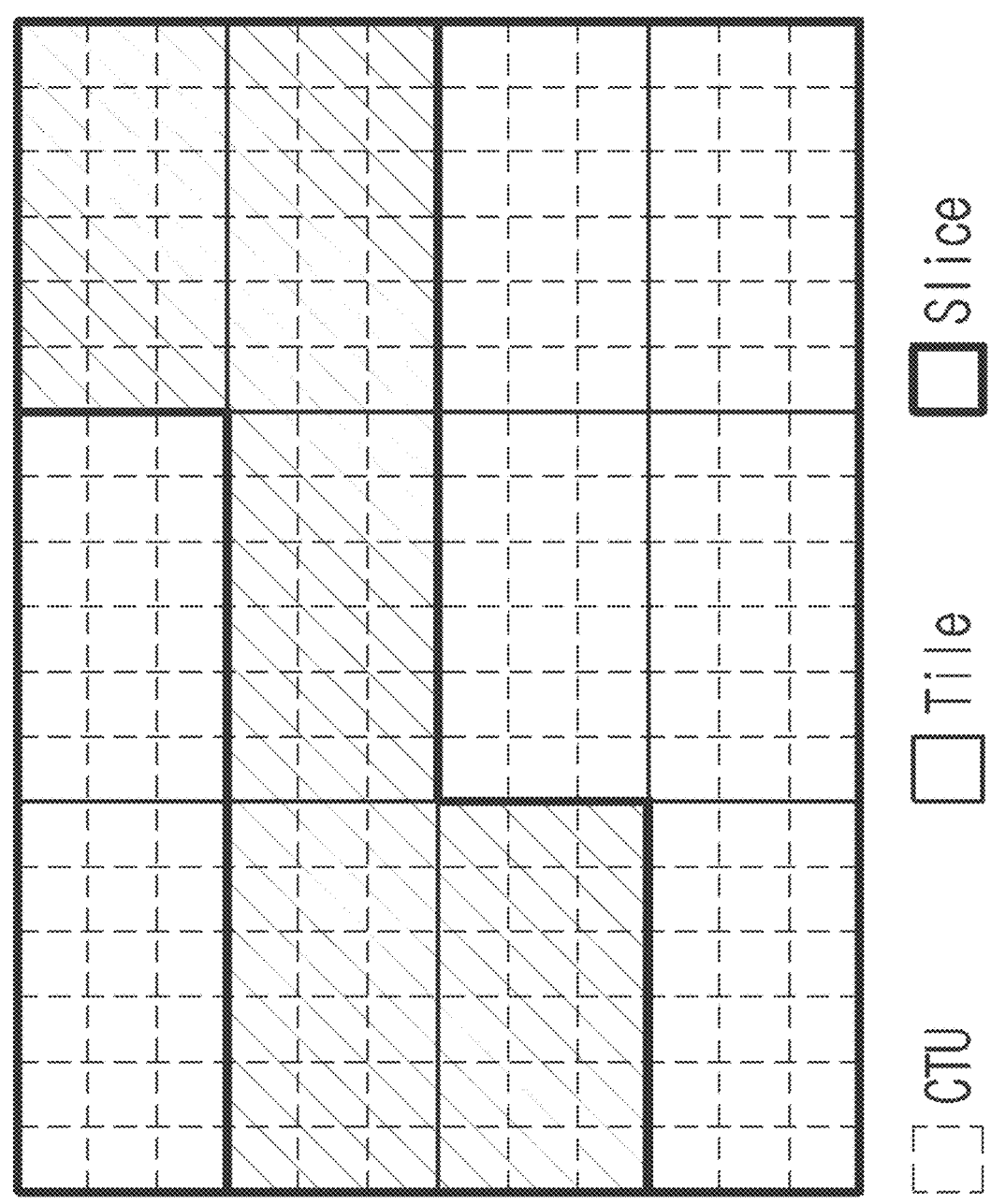
[FIG. 5]

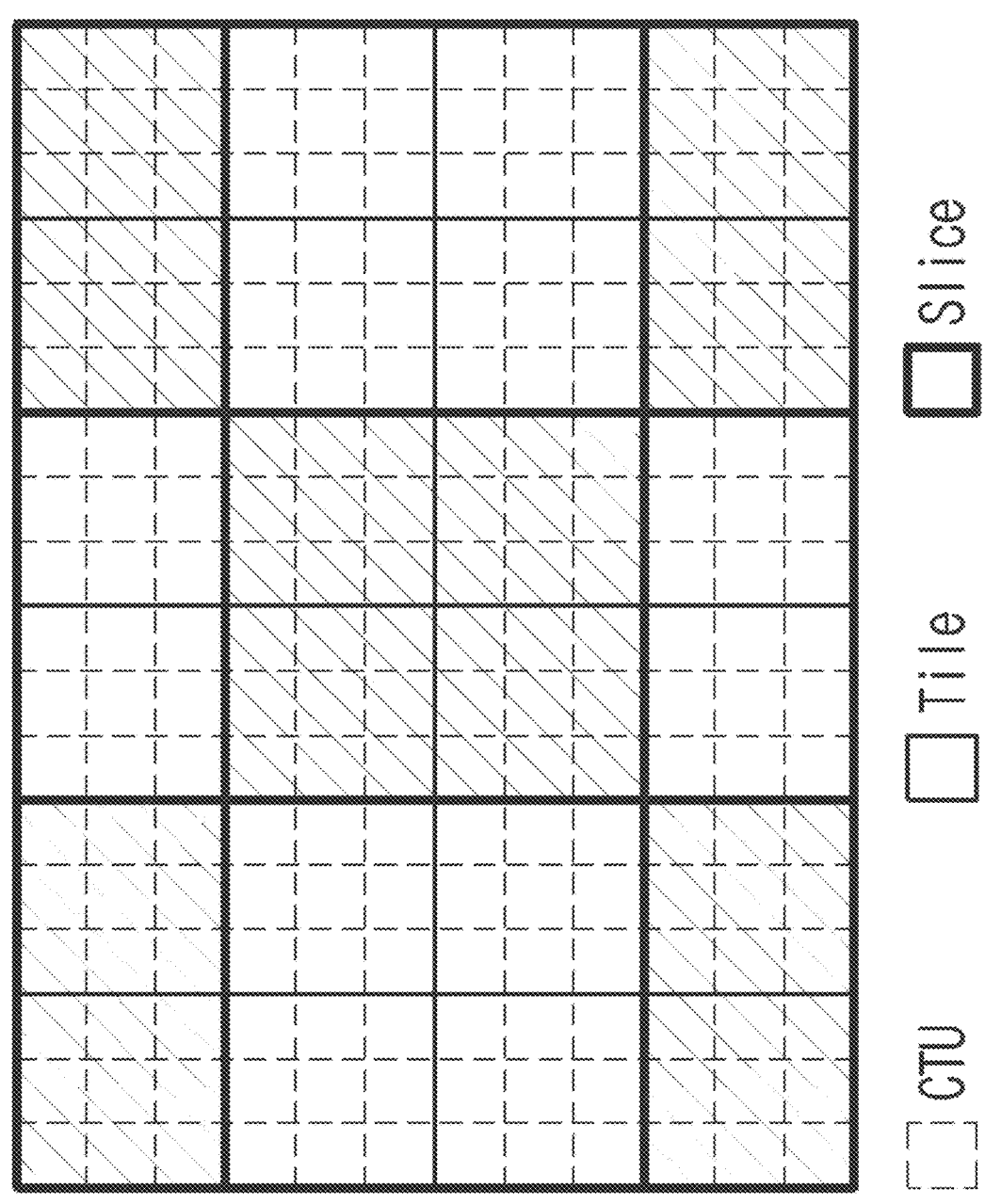
[FIG. 6]

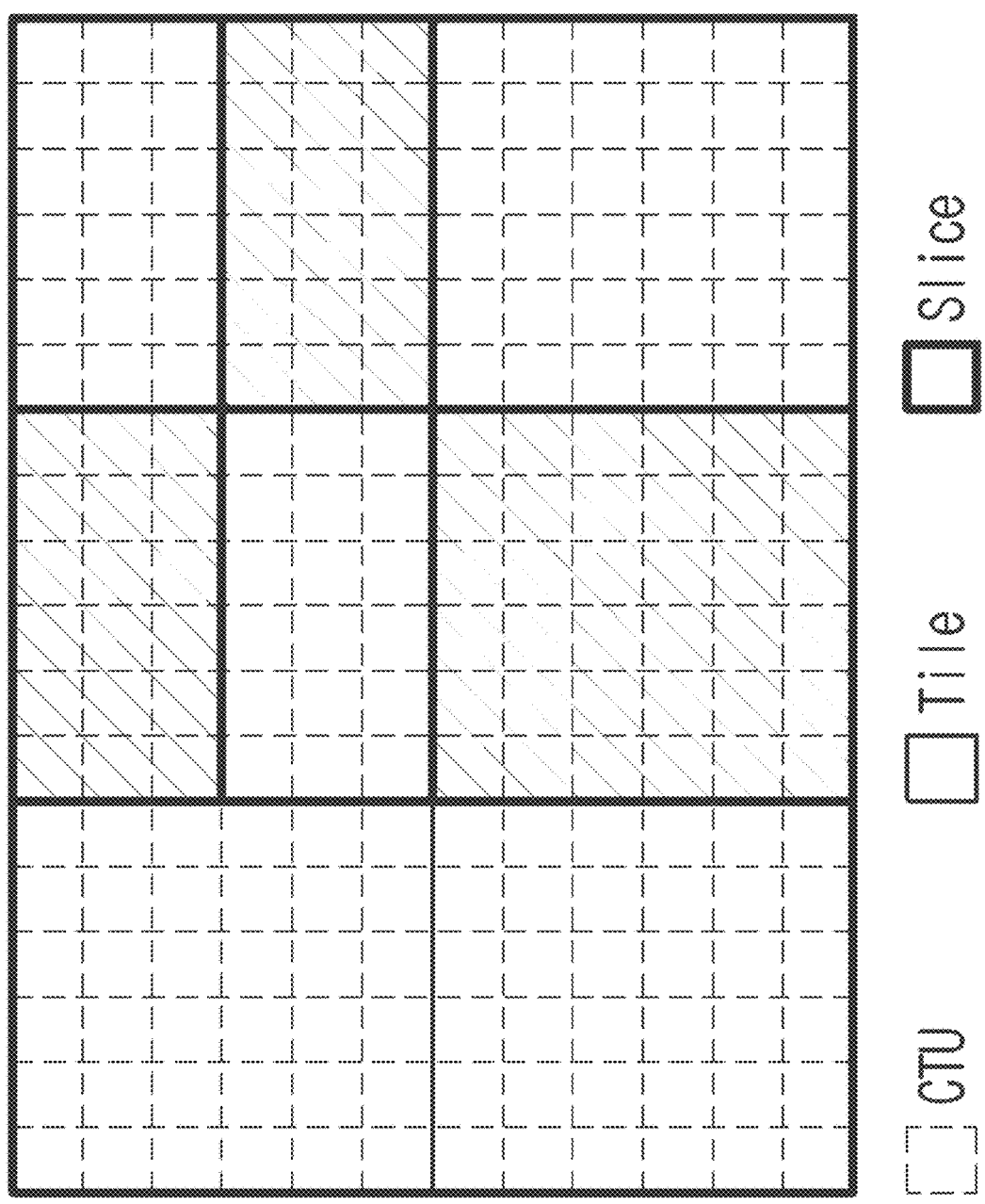
CTU    Tile    Slice
[FIG. 7]

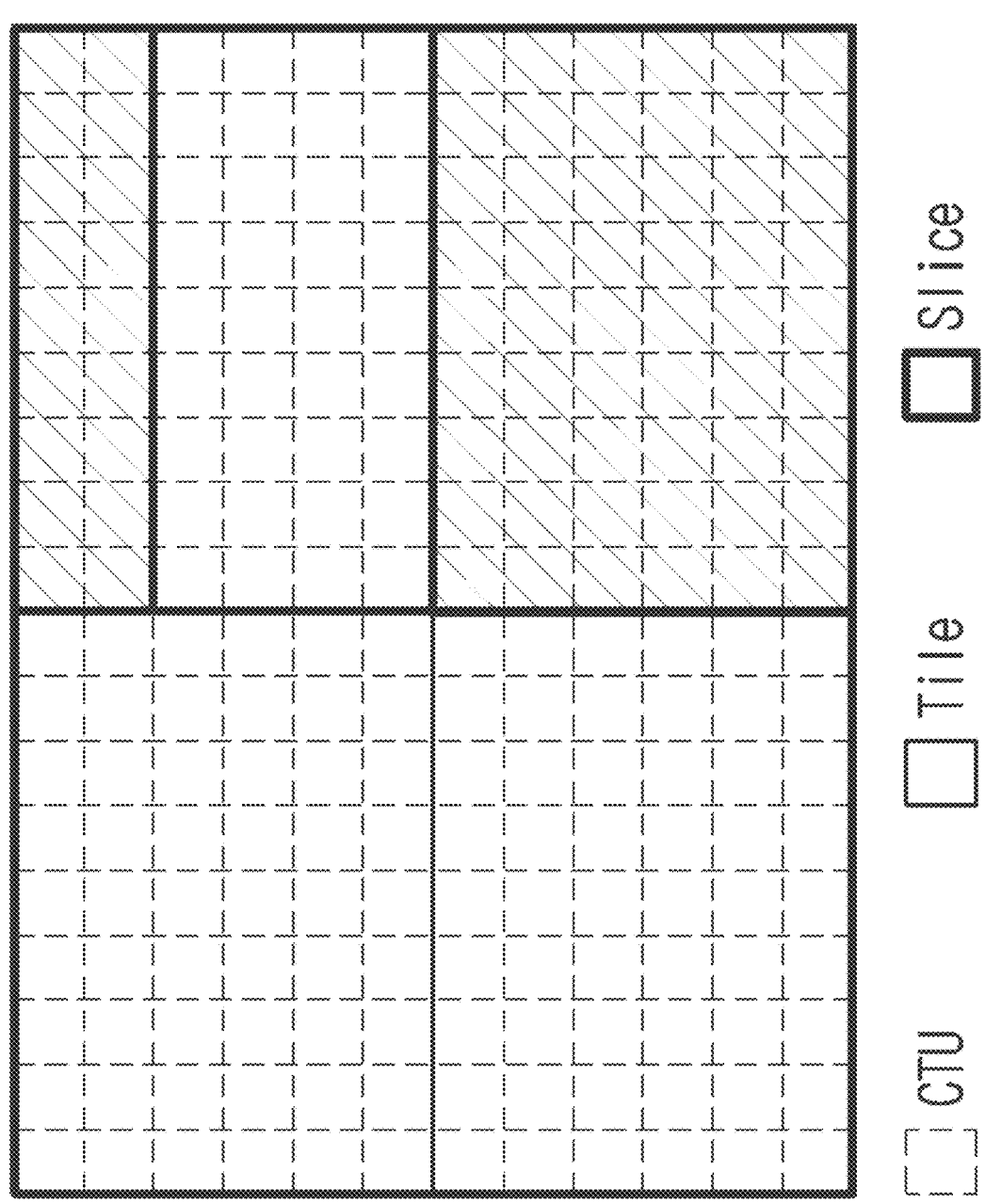
[FIG. 8]
CTU  Tile  Slice

[FIG. 9]
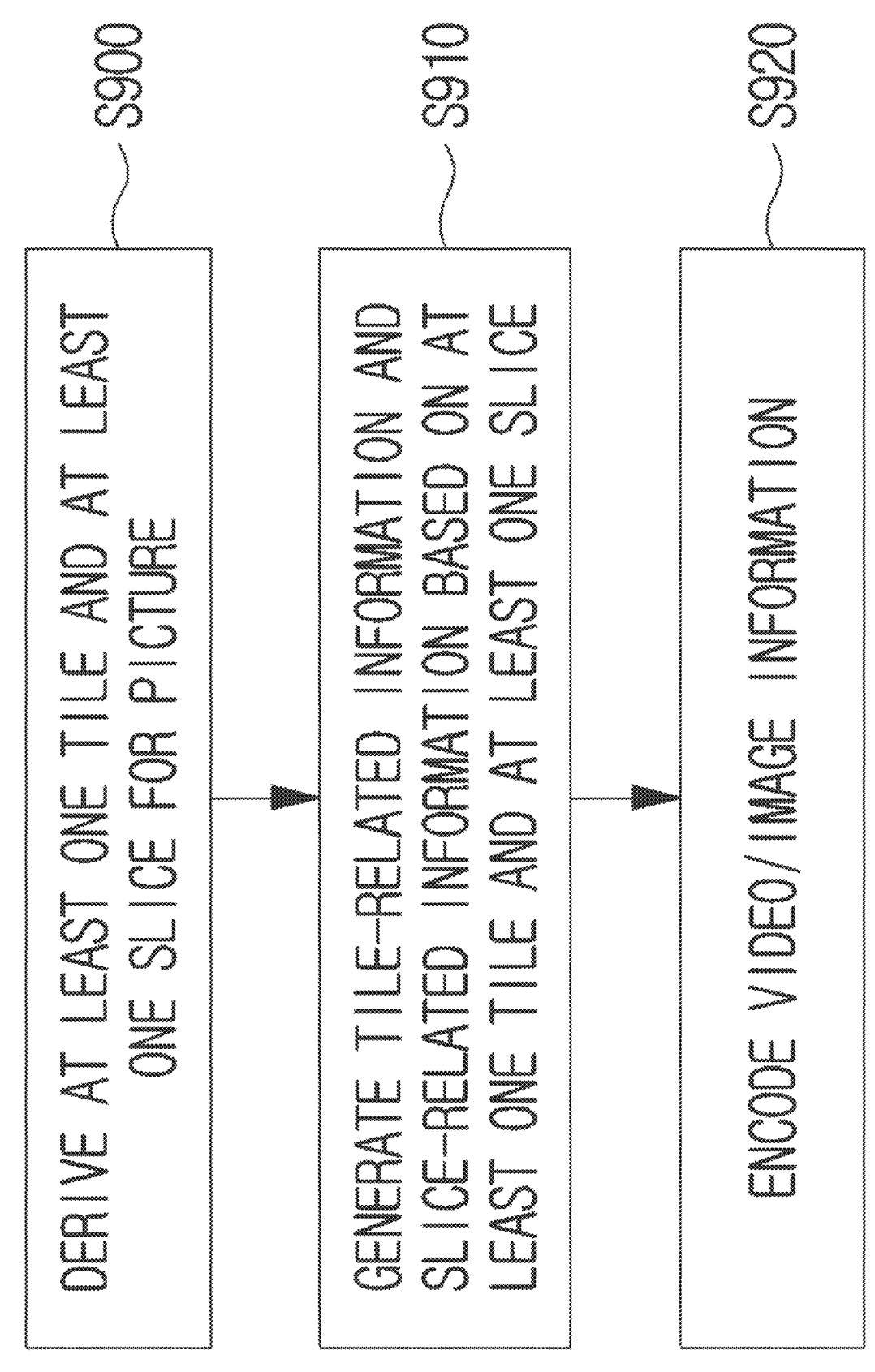

[FIG. 10]
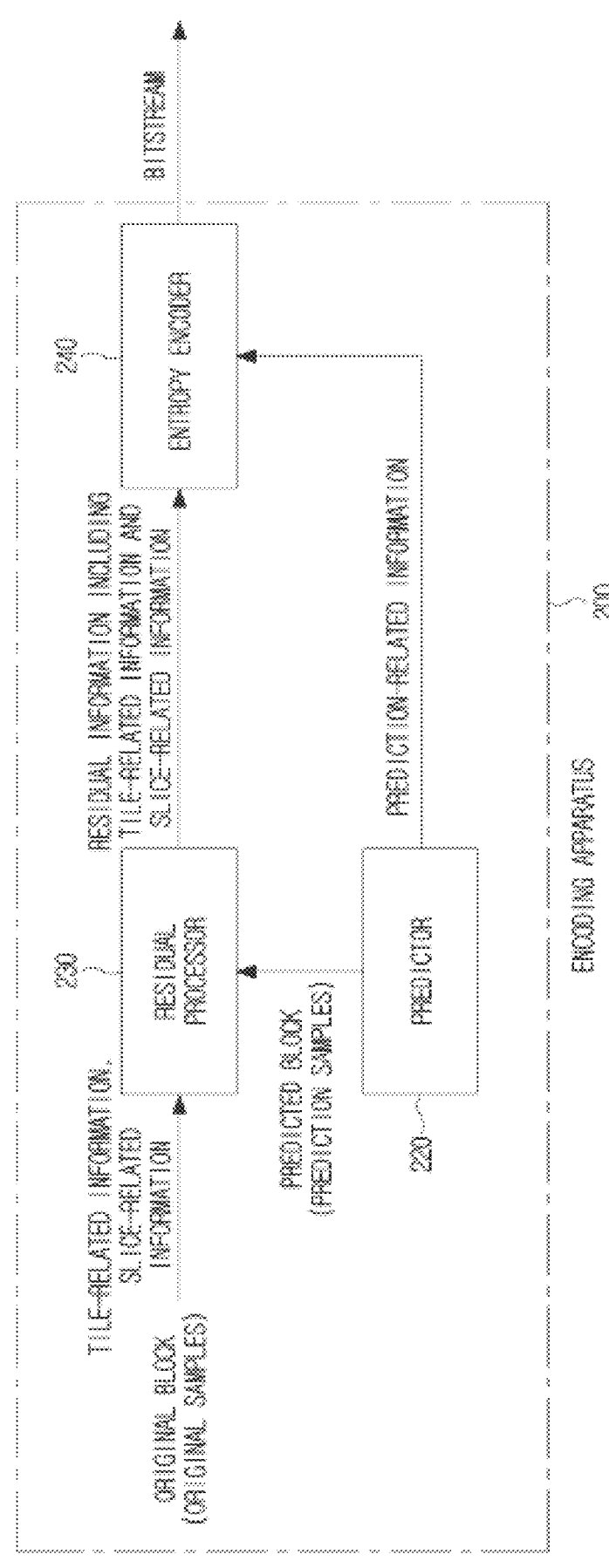

[FIG. 11]
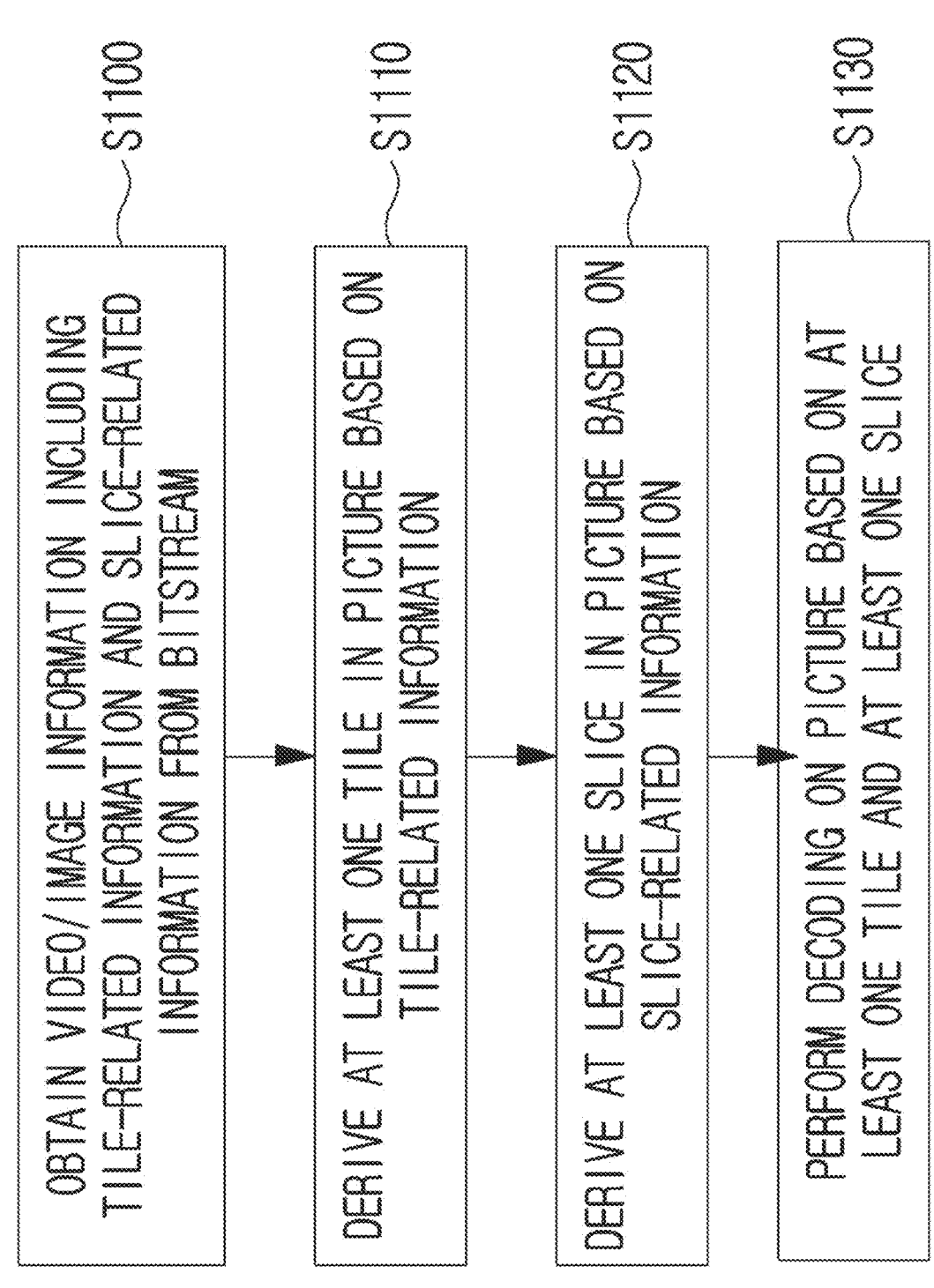

[FIG. 12]
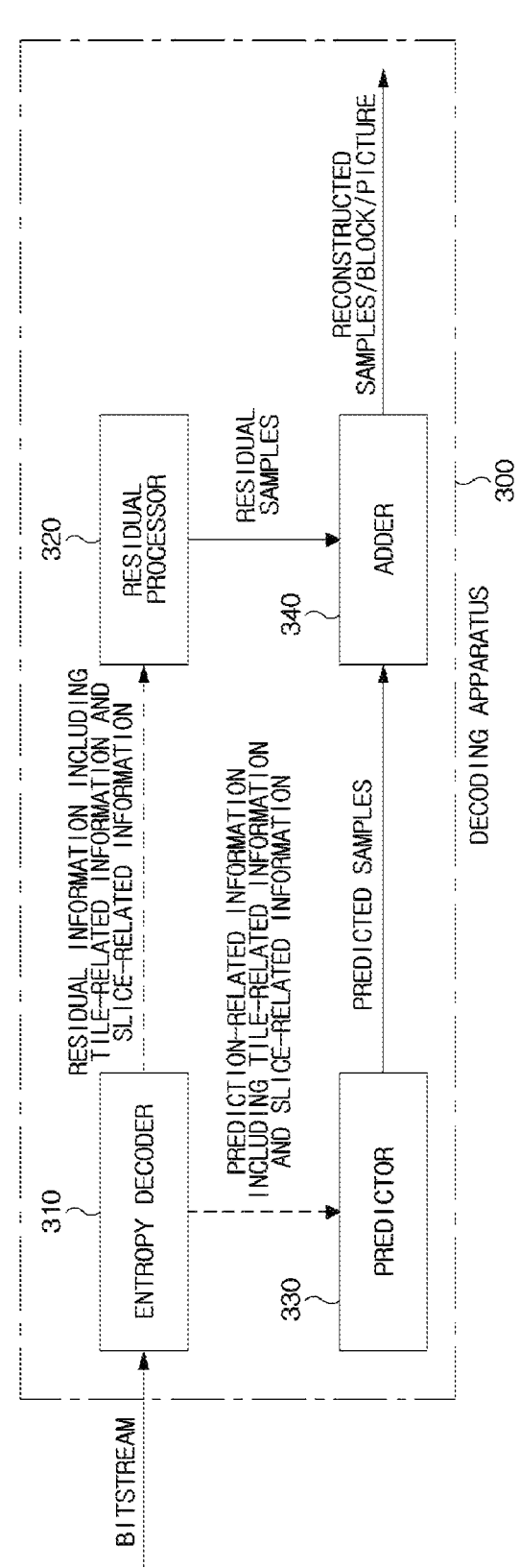

[FIG. 13]
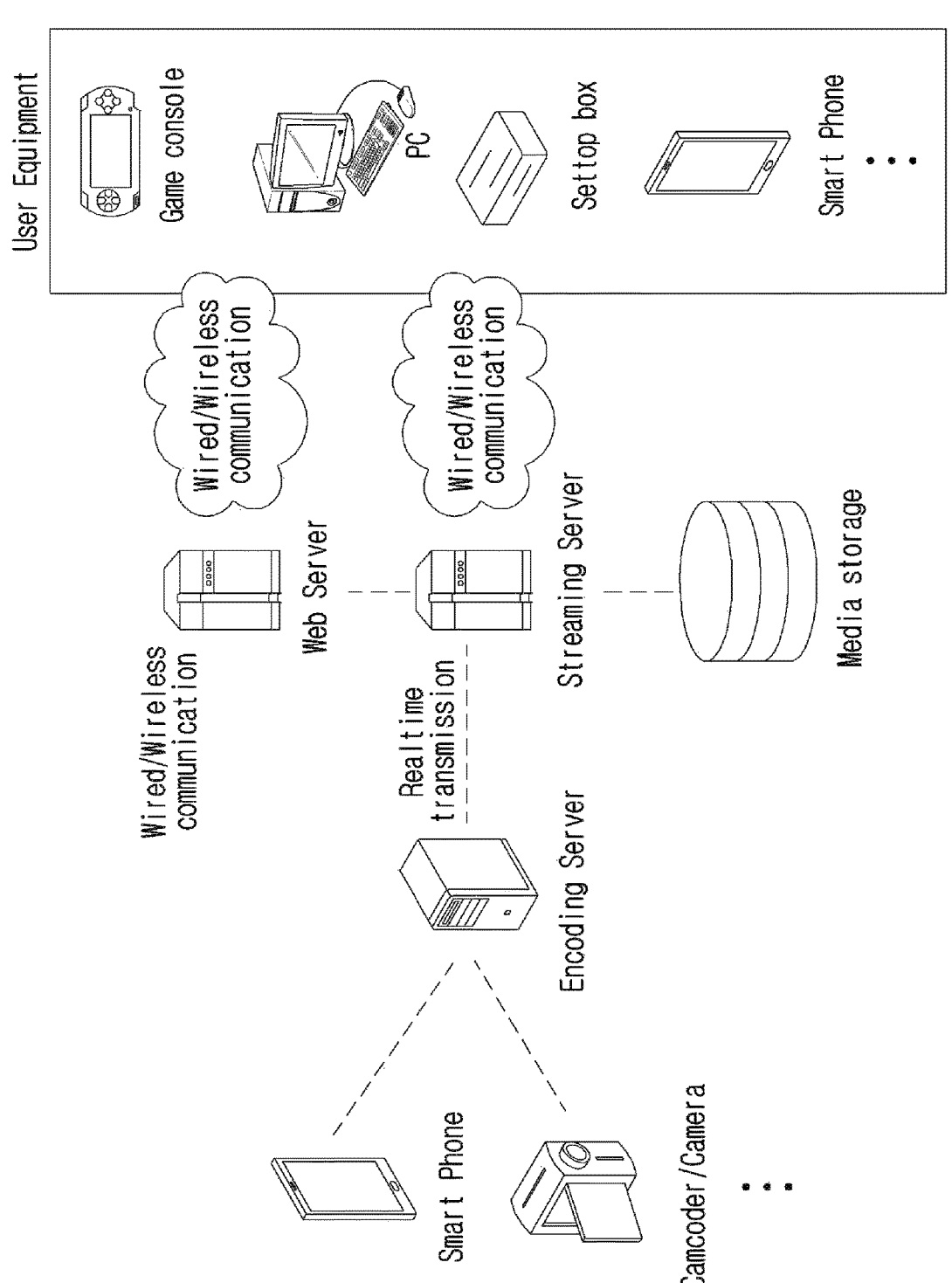

1

IMAGE CODING METHOD BASED ON INFORMATION RELATED TO TILE AND INFORMATION RELATED TO SLICE IN VIDEO OR IMAGE CODING SYSTEM

CROSS-REFERENCE TO RELATED APPLICATIONS

This application is a continuation of U.S. patent application Ser. No. 17/909,943 filed Sep. 7, 2022, now allowed, which is the National Phase of PCT International Application No. PCT/KR2021/002745, filed on Mar. 5, 2021, which claims priority under 35 U.S.C. 119(e) to a U.S. Provisional Application No. 62/987,331, filed on Mar. 9, 2020, which is hereby incorporated by reference herein in their entirety.

TECHNICAL FIELD

The present disclosure is related to video/image coding technology, and more particularly, to an image coding method based on tile-related information and slice-related information in a video or image coding system.

BACKGROUND ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

DISCLOSURE

Technical Problem

According to an embodiment of the present disclosure, a method and an apparatus for increasing image/video coding efficiency are provided.

According to an embodiment of the present disclosure, a method and an apparatus for efficiently performing coding through picture partitioning are provided.

According to an embodiment of the present disclosure, a method and apparatus for signaling tile-related information and slice-related information are provided.

According to an embodiment of the present disclosure, when one tile exists in a picture and slices in the picture are rectangular slices, a method and apparatus for efficiently signaling slice-related information are provided.

According to an embodiment of the present disclosure, a method and apparatus for signaling information related to a tile column based on frequency information for tile columns having the same width are provided.

According to an embodiment of the present disclosure, a method and an apparatus for signaling information related to a tile row based on frequency information for tile rows having the same height are provided.

According to an embodiment of the present disclosure, a video/image decoding method performed by a decoding apparatus is provided.

According to an embodiment of the present disclosure, a decoding apparatus for performing video/image decoding is provided.

According to an embodiment of the present disclosure, a video/image encoding method performed by an encoding apparatus is provided.

According to an embodiment of the present disclosure, an encoding apparatus for performing video/image encoding is provided.

According to one embodiment of the present disclosure, a computer-readable digital storage medium, in which encoded video/image information generated according to the video/image encoding method disclosed in at least one of the embodiments of the present disclosure is stored, is provided.

According to an embodiment of the present disclosure, a computer-readable digital storage medium, in which encoded information or encoded video/image information causing performing a video/image decoding method disclosed in at least one of the embodiments of the present disclosure by a decoding apparatus.

Technical Effects

According to an embodiment of the present disclosure, overall video/image compression efficiency may be increased.

According to an embodiment of the present disclosure, coding may be efficiently performed through picture partitioning.

According to an embodiment of the present disclosure, tile-related information and slice-related information may be signaled.

According to an embodiment of the present disclosure, when one tile exists in a picture and slices in the picture are rectangular slices, slice-related information can be efficiently signaled.

According to an embodiment of the present disclosure, information related to a tile column may be signaled based on frequency information for tile columns having the same width.

According to an embodiment of the present disclosure, information related to a tile row may be signaled based on frequency information for tile rows having the same height.

DESCRIPTION OF DIAGRAMS

FIG. 1 schematically illustrates an example of a video/image coding system to which the present disclosure is applicable.

FIG. 2 is a diagram schematically illustrating a configuration of a video/image encoding apparatus to which the present disclosure is applicable.

FIG. 3 is a diagram schematically illustrating a configuration of a video/image decoding apparatus to which the present disclosure is applicable.

FIG. 4 exemplarily illustrates a hierarchical structure for a coded image/video.

FIGS. 5 to 8 illustrate embodiments in which a picture is divided into slices and tiles.

FIGS. 9 and 10 schematically illustrate examples of a video/image encoding method and related components according to embodiment(s) of the present disclosure.

FIGS. 11 and 12 schematically illustrate examples of an image/video decoding method and related components according to an embodiment of the present disclosure.

FIG. 13 illustrates an example of a content streaming system to which embodiments disclosed in the present disclosure is applicable.

BEST MODEL

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs may be used for the same components on the drawings, and repeated descriptions for the same components may be omitted.

FIG. 1 schematically illustrates an example of a video/image coding system to which embodiments of the present disclosure are applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded image/video information) may be output in the form of a bitstream.

The transmitter may transmit the encoded image/video information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

The present disclosure is related to video/image coding. For example, a method/embodiment disclosed in the present disclosure may be applied to a method disclosed in a versatile video coding (VVC) standard. In addition, the method/embodiment disclosed in the present disclosure may be applied to a method disclosed in the essential video coding (EVC) standard, the AOMedia Video 1 (AV1) standard, the 2nd generation of audio video coding standard (AVS2), or a next-generation video/video coding standard (e.g., H.267 or H.268, etc.).

In the present disclosure, a variety of embodiments relating to video/image coding may be provided, and, unless specified to the contrary, the embodiments may be combined to each other and be performed.

In the present disclosure, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. A tile is a rectangular region of CTUs within a specific tile column and a specific tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture, CTUs in a tile are ordered consecutively in a CTU raster scan, and tiles in a picture are ordered consecutively in a raster scan of the tiles of the picture. A slice may include an integer number of complete tiles or an integer number of consecutive complete CTU rows within a tile of a picture that may be exclusively contained in a single NAL unit.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In the present disclosure, "A or B" may mean "only A", "only B" or "both A and B". In other words, "A or B" in the present disclosure may be interpreted as "A and/or B". For example, in the present disclosure, "A, B or C" means "only A", "only B", "only C", or "any combination of A, B and C".

A slash (/) or comma (,) used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 2 is a diagram schematically illustrating a configuration of a video/image encoding apparatus to which embodiments of the present disclosure are applicable. Hereinafter, what is referred to as the encoding apparatus may include an image encoding apparatus and/or a video encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The encoding apparatus 200 subtracts the prediction signal (predicted block, prediction sample array) output from the inter predictor 221 or the intra predictor 222 from the input image signal (original block, original sample array) to generate a residual signal (residual signal, residual block, residual sample array), and the generated residual signal is transmitted to the transformer 232. In this case, as illustrated, a unit for subtracting a prediction signal (prediction block, prediction sample array) from an input image signal (original block, original sample array) in the encoder 200 may be referred to as a subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, sub-block, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure. The palette mode may be an example of intra coding or intra prediction. When the palette mode is applied, the sample value in the picture may be signaled based on information on the palette table and the palette index.

The prediction signal generated through the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded image/video information) may be transmitted or stored on a unit basis of a network abstraction layer (NAL) in the form of a bitstream. The image/video information may further include information on various parameter sets such as an adaptation parameter set (APS), a picture parameter set (PPS), a sequence parameter set (SPS), a video parameter set (VPS) or the like. Further, the image/video information may further include general constraint information. In the present disclosure, information and/or syntax elements which are transmitted/signaled to the decoding apparatus from the encoding apparatus may be included in image/video information. The image/video information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 200 and the decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

FIG. 3 is a diagram schematically illustrating a configuration of a video/image decoding apparatus to which the present disclosure is applicable. Hereinafter, the decoding apparatus may include an image decoding apparatus and/or a video decoding apparatus.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including image/video information is input, the decoding apparatus 300 may reconstruct an image correspondingly to a process by which image/video information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/ bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/ external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The inverse transformer 322 obtains a residual signal (residual block, residual sample array) by inverse transforming transform coefficients.

The predictor 330 may perform prediction on the current block, and generate a predicted block including prediction samples for the current block. The predictor 330 may determine whether intra prediction or inter prediction is applied to the current block based on the information on prediction output from the entropy decoder 310, and specifically may determine an intra/inter prediction mode.

The predictor 300 may generate a prediction signal based on various prediction methods. For example, the predictor 300 may apply intra prediction or inter prediction for prediction on one block, and, as well, may apply intra prediction and inter prediction at the same time. This may be called combined inter and intra prediction (CIIP). In addition, the predictor 300 may be based on the intra block copy (IBC) prediction mode or the palette mode in order to predict a block. The IBC prediction mode or the palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure. The palette mode may be an example of intra coding or intra prediction. When the palette mode is applied, information on the palette table and the palette index may be signaled by being included in the image/video information.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, sub-block, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor (including the inter predictor 332 and/or the intra predictor 331). When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In the present disclosure, the embodiments described in the filter 260, the inter predictor 221, and the intra predictor 222 of the encoding apparatus 200 may be applied equally or correspondingly to the filter 350, the inter predictor 332, and the intra predictor 331 of the decoding apparatus 300, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

In the present disclosure, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be referred to as a coefficient or a residual coefficient, or a transform coefficient for uniformity of expression.

Also, in the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) for the transform coefficients. Residual samples may be derived based on an inverse transform (transform) for the scaled transform coefficients. This may be applied/expressed in other parts of the present disclosure as well.

FIG. 4 exemplarily illustrates a hierarchical structure for a coded image/video.

Referring to FIG. 4, a coded image/video is divided into a video coding layer (VCL) that handles decoding processing of an image/video and itself, a sub-system that transmits and stores coded information, and a network abstraction layer (NAL) that exists between VCL and a sub-system and is responsible for network adaptation functions.

In VCL, VCL data including compressed image data (slice data) is generated, or a parameter set including information such as a picture parameter set (PPS), a sequence parameter set (SPS), video parameter set (VPS) or a supplemental enhancement information (SEI) message additionally required for an image decoding process may be generated.

In NAL, a NAL unit may be generated by adding header information (NAL unit header) to a raw byte sequence payload (RBSP) generated in VCL. In this case, RBSP refers to slice data, a parameter set, SEI messages, etc. generated in VCL. A NAL unit header may include NAL unit type information specified according to RBSP data included in the corresponding NAL unit.

As shown in FIG. 4, a NAL unit may be divided into a VCL NAL unit and a Non-VCL NAL unit according to RBSP generated in VCL. A VCL NAL unit may mean a NAL unit including information on an image (sliced data), and a Non-VCL NAL unit may mean a NAL unit including information necessary for decoding an image (a parameter set or SEI message).

The above-described VCL NAL unit and Non-VCL NAL unit may be transmitted through a network by attaching header information according to a data standard of a sub-system. For example, a NAL unit may be transformed into a data form of a predetermined standard such as H.266/VVC file format, Real-time Transport Protocol (RTP), Transport Stream (TS), and transmitted through various networks.

As described above, a NAL unit type of a NAL unit may be specified according to a RBSP data structure included in the corresponding NAL unit, and information on this NAL unit type may be stored in a NAL unit header and signaled.

For example, a NAL unit may be classified into a VCL NAL unit type and a Non-VCL NAL unit type according to whether or not a NAL unit includes image information (slice data). A VCL NAL unit type may be classified according to a property and a type of a picture included in a VCL NAL unit, and a Non-VCL NAL unit type may be classified according to a type of a parameter set.

The following is an example of a NAL unit type specified according to a type of a parameter set included in a Non-VCL NAL unit type.

APS (Adaptation Parameter Set) NAL unit: Type for a NAL unit including APS

DPS (Decoding Parameter Set) NAL unit: Type for a NAL unit including DPS

VPS (Video Parameter Set) NAL unit: Type of a NAL unit including VPS

SPS (Sequence Parameter Set) NAL unit: Type for a NAL unit including SPS

PPS (Picture Parameter Set) NAL unit: Type of a NAL unit including PPS

PH (Picture header) NAL unit: Type of a NAL unit including PH

The above-described NAL unit types have syntax information for a NAL unit type, and the syntax information may be stored in a NAL unit header and signaled. For example, the syntax information may be nal_unit_type, and NAL unit types may be specified by a value of nal_unit_type.

Meanwhile, as described above, one picture may include a plurality of slices, and one slice may include a slice header and slice data. In this case, one picture header may be further added for a plurality of slices (a set of slice headers and slice data) in one picture. The picture header (picture header syntax) may include information/parameters commonly applicable to the picture. For example, one picture may consist of slices of different types, such as intra-coded slices (i.e., I-slice) and/or inter-coded slices (i.e., P-slice and B-slice). In this case, a picture header may include information/parameters applied to an intra-coded slice and an inter-coded slice. Alternatively, one picture may consist of of slices of one type.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In the present disclosure, a high level syntax (HLS) may include at least one of the APS syntax, the PPS syntax, the SPS syntax, the VPS syntax, the DPS syntax, the picture header syntax, or the slice header syntax.

In the present disclosure, image/video information is encoded and signaled in the form of a bitstream from an encoding apparatus to a decoding apparatus. Image/video information may include picture partitioning-related information, intra/inter prediction information, residual information, in-loop filtering information, information included in the slice header, information included in the picture header, information included in the APS, information included in the PPS, information included in the SPS, information included in the VPS, and/or information included in the DPS. In addition, the image/video information may further include information of a NAL unit header.

Meanwhile, an encoding apparatus and a decoding apparatus may encode/decode a picture by dividing the picture into predetermined units. For example, an encoding apparatus and a decoding apparatus may encode/decode a picture by dividing the picture into slices and/or tiles.

As described above, one picture may be divided into one or more tile rows and/or one or more tile columns. A tile is a rectangular region of CTUs within a specific tile row and a specific tile row in a picture. CTUs included in one tile may be arranged according to a specific scan order. For example, CTUs included in one tile may be sequentially arranged according to a raster scan order within a tile. A slice may consist of an integer number of complete tiles or an integer number of consecutive CTU rows included in a tile of a picture.

In this case, a vertical boundary of each slice in a picture may be a vertical boundary of a tile. A horizontal boundary of each slice in a picture may be a horizontal boundary of a tile or a horizontal boundary of a CTU within a tile. When a horizontal boundary of each slice in a picture is not a horizontal boundary of a tile but a horizontal boundary of a CTU within a tile, a tile in a picture may be divided into a plurality of rectangular slices, and each of the plurality of rectangular slices may consist of an integer number of consecutive CTU rows.

Slices may exist in a raster scan slice mode and a rectangular slice mode. In case of a raster scan slice mode, one slice may include one or more tiles arranged in a raster scan within a picture. In case of a rectangular slice mode, one slice may include an integer number of complete tiles forming a rectangular region within a picture or an integer number of consecutive CTU rows within one tile forming a rectangular region within a picture. Tiles in a rectangular slice may be scanned according to a raster scan order within a region of the rectangular slice.

One subpicture may include one or more slices constituting a rectangular region of a picture. A boundary of each subpicture may always be a boundary of a slice, and a vertical boundary of each subpicture may always be a vertical boundary of a tile.

In addition, at least one of the following conditions should be satisfied for each of a subpicture and a tile.

All CTUs in a subpicture belong to the same tile.

All CTUs in a tile belong to the same subpicture.

In this regard, when one picture is divided into a plurality of subpictures, a plurality of tiles, and a plurality of slices, information related to a subpicture may be signaled through the SPS, and information related to a tile and a rectangular slice may be signaled through the PPS, and information related to a raster scan slice may be signaled through a slice header.

FIG. 5 illustrates an embodiment in which a picture is divided into slices and tiles.

Here, a thick line indicates a boundary of a slice, a thin line indicates a boundary of a tile, and a dotted line indicates a boundary of a CTU. Referring to FIG. 5, a picture is composed of 216 (18×12) CTUs, 3 tile columns, and 4 tile rows. Accordingly, the picture is composed of 12 tiles and the picture is composed of 3 slices according to a raster scan slice mode. Here, among the 3 slices, a slice 1 according to a raster scan order is composed of 2 complete tiles according to a raster scan order, a slice 2 is composed of 5 complete tiles according to a raster scan order, and a slice 3 is composed of 5 complete tiles according to a raster scan order. A vertical boundary of each of the three slices is composed of a vertical boundary of a tile in the picture. A horizontal boundary of each of the three slices is composed of a horizontal boundary of a tile (CTU within a tile) in the picture.

FIG. 6 illustrates an embodiment in which a picture is divided into slices and tiles.

Similarly, a thick line indicates a boundary of a slice, a thin line indicates a boundary of a tile, and a dotted line indicates a boundary of a CTU. Referring to FIG. 6, a picture is composed of 216 (18×12) CTUs, 6 tile columns, and 4 tile rows. Accordingly, the picture composed of 24 tiles and the picture is composed of 9 slices according to a rectangular slice mode. Here, among the 9 slices, each of slices 1, 2, 3, 7, 8, and 9 according to a raster scan order is composed of 2 complete tiles, and each of slices 4, 5 and 6 is composed of 4 complete tiles. A vertical boundary of each of the 9 slices is composed of a vertical boundary of a tile in the picture. A horizontal boundary of each of the 9 slices is composed of a horizontal boundary of a tile (CTU within a tile) in the picture.

FIG. 7 illustrates an embodiment in which a picture is divided into slices and tiles.

Similarly, a thick line indicates a boundary of a slice, a thin line indicates a boundary of a tile, and a dotted line indicates a boundary of a CTU. Referring to FIG. 7, a picture is composed of 216 (18×12) CTUs, 3 tile columns, and 2 tile rows. Accordingly, the picture is composed of 6 tiles and 7 slices according to a rectangular slice mode. Here, among the 7 slices, a slice 1 according to a raster scan order is composed of 2 complete tiles, each of slices 2, 3, 4, and 5 is composed of 3 consecutive CTU rows included in a tile, and each of slices 6 and 7 is composed of one complete tile. A vertical boundary of each of the 7 slices is composed of a vertical boundary of a tile in the picture. A horizontal boundary of each of slices 1, 6, and 7 among the 7 slices is composed of a horizontal boundary of a tile (CTU within a tile) in the picture. An upper horizontal boundary of each of slices 2 and 3 among the 7 slices is composed of a horizontal boundary of a tile (CTU within a tile) in the picture, and a lower horizontal boundary is composed of a horizontal boundary of CTUs in a tile, not a horizontal boundary of a tile. An upper horizontal boundary of each of slices 4 and 5 among the 7 slices is composed of a horizontal boundary of CTUs within a tile, not a horizontal boundary of a tile, and a lower horizontal boundary is composed of a horizontal boundary of a tile (CTU within a tile) in the picture.

FIG. 8 illustrates an embodiment in which a picture is divided into slices and tiles.

Similarly, a thick line indicates a boundary of a slice, a thin line indicates a boundary of a tile, and a dotted line indicates a boundary of a CTU. Referring to FIG. 8, a picture is composed of 216 (18×12) CTUs, 2 tile columns, and 2 tile rows. Accordingly, the picture is composed of 4 tiles and 5 slices according to a rectangular slice mode. Here, among the 5 slices, each of slices 1, 4, and 5 according to a raster scan order is composed of one complete tile, a slice 2 is composed of 2 consecutive CTU rows included in a tile, and a slice 3 is composed of 4 consecutive CTU rows included in a tile. A horizontal boundary of each of slices 1, 4, and 5 among the 5 slices is composed of a horizontal boundary of a tile (CTU within a tile) in the picture. An upper horizontal boundary of a slice 2 among the 5 slices is composed of a horizontal boundary of a tile (CTU within a tile) in the picture, and a lower horizontal boundary is composed of a horizontal boundary of CTUs within a tile, not a horizontal boundary of a tile. An upper horizontal boundary of a slice 3 among the 5 slices is composed of a horizontal boundary of CTUs within a tile, not a horizontal boundary of a tile, and a lower horizontal boundary is composed of a horizontal boundary of a tile (CTU within a tile) in the picture.

In this way, a picture may be divided into at least one tile and at least one slice, and tile-related information, which is information on the at least one tile, and slice-related information, which is information on the at least one slice, may be signaled/parsed at the PPS.

Such picture partitioning (picture division) may be applied to parallel processing or error resilience.

As an example, some implementations running on a multi-core CPU is possible when a picture is divided into a plurality of tiles and a plurality of slices. When a picture is divided into a plurality of tiles and/or a plurality of slices, each tile and/or each slice may be processed in parallel in a separate core. This approach can be particularly useful for high-resolution real-time coding of video that would otherwise be impossible to achieve, and memory limitations can be reduced by reducing information sharing between tiles. In addition, there is an advantage that a plurality of tiles can be distributed and processed in different threads while parallel processing is executed. For example, in deriving candidate motion information in inter prediction, a neighboring block existing in other slices or tiles may be regarded as unavailable. Accordingly, context information used to code information or a syntax element may be initialized in each slice or tile.

As another example, it may be motivated by requirements of some embodiments to apply Unequal Error Protection (UEP) to a coded tile or slice.

In this regard, according to an existing embodiment, the PPS may include the syntax of Table 1 below. The syntax of Table 1 below may be a part of the PPS.

TABLE 1

| | Descriptor |
|---|---|
| pic_parameter_set_rbsp( ) { | |
| ... | |
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; i <= num_exp_tile_columns_minus1; i++ ) | |
| tile_column_width_minus1[ i ] | ue(v) |
| for( i = 0; i <= num_exp_tile_rows_minus1; i++ ) | |
| tile_row_height_minus1[ i ] | ue(v) |
| if( NumTilesInPic > 1 ) | |
| rect_slice_flag | u(1) |
| if( rect_slice_flag ) | |
| single_slice_per_subpic_flag | u(1) |
| if( rect_slice_flag && !single_slice_per_subpic_flag ) { | |
| num_slices_in_pic_minus1 | ue(v) |
| if( num_slices_in_pic_minus1 > 0 ) | |
| tile_idx_delta_present_flag | u(1) |
| for( i = 0; i < num_slices_in_pic_minus1; i++ ) { | |
| if( NumTileColumns > 1 ) | |
| slice_width_in_tiles_minus1[ i ] | ue(v) |
| if( NumTileRows > 1 && ( tile_idx_delta_present_flag \|\| | |
| SliceTopLeftTileIdx[ i ] % NumTileColumns = = 0 ) ) | |

TABLE 1-continued

| | Descriptor |
|---|---|
| slice_height_in_tiles_minus1[ i ] | ue(v) |
| if( slice_width_in_tiles_minus1[ i ] = = 0 && | |
| slice_height_in_tiles_minus1[ i ] = = 0 && | |
| RowHeight[ SliceTopLeftTileIdx[ i ] / NumTileColumns ] > 1 ) { | |
| num_exp_slices_in_tile[ i ] | ue(v) |
| for( j = 0; j < num_exp_slices_in_tile[ i ]; j++ ) | |
| exp_slice_height_in_ctus_minus1[ i ][ j ] | ue(v) |
| i += NumSlicesInTile[ i ] − 1 | |
| } | |
| if( tile_idx_delta_present_flag && i < num_slices_in_pic_minus1 ) | |
| tile_idx_delta[ i ] | se(v) |
| } | |
| } | |
| loop_filter_across_tiles_enabled_flag | u(1) |
| loop_filter_across_slices_enabled_flag | u(1) |
| } | |
| . . . | |

Here, semantics of the syntax elements included in the ²⁰ syntax of Table 1 may be expressed, for example, as shown in Table 2 below.

TABLE 2 no_pic_partition_flag equal to 1 specifies that no picture partitioning is applied to each picture referring to the PPS.
no_pic_partition_flag equal to 0 specifies each picture referring to the PPS may be partitioned into more than one tile or slice.
pps_log2_ctu_size_minus5 plus 5 specifies the luma coding tree block size of each CTU.
pps_log2_ctu_size_minus5 shall be equal to sps_log2_ctu_size_minus5.
num_exp_tile_columns_minus1 plus 1 specifies the number of explicitly provided tile column widths. The value of num_exp_tile_columns_minus1 shall be in the range of 0 to PicWidthInCtbsY − 1, inclusive. When no_pic_partition_flag is equal to 1, the value of num_exp_tile_columns_minus1 is inferred to be equal to 0.
num_exp_tile_rows_minus1 plus 1 specifies the number of explicitly provided tile row heights. The value of num_exp_tile_rows_minus1 shall be in the range of 0 to PicHeightInCtbsY − 1, inclusive. When no_pic_partition_flag is equal to 1, the value of num_tile_rows_minus1 is inferred to be equal to 0.
tile_column_width_minus1[ i ] plus 1 specifies the width of the i-th tile column in units of CTBs for i in the range of 0 to num_exp_tile_columns_minus1 − 1, inclusive.
tile_column_width_minus1[ num_exp_tile_columns_minus1 ] is used to derive the width of the tile columns with index greater than or equal to num_exp_tile_columns_minus1 as specified in clause 6.5.1. The value of tile_column_width_minus1[ i ] shall be in the range of 0 to PicWidthInCtbsY − 1, inclusive. When not present, the value of tile_column_width_minus1[ 0 ] is inferred to be equal to PicWidthInCtbsY − 1.
tile_row_height_minus1[ i ] plus 1 specifies the height of the i-th tile row in units of CTBs for i in the range of 0 to num_exp_tile_rows_minus1 − 1, inclusive. tile_row_height_minus1[ num_exp_tile_rows_minus1 ] is used to derive the height of the tile rows with index greater than or equal to num_exp_tile_rows_minus1 as specified in clause 6.5.1. The value of tile_row_height_minus1[ i ] shall be in the range of 0 to PicHeightInCtbsY − 1, inclusive. When not present, the value of tile_row_height_minus1[ 0 ] is inferred to be equal to PicHeightInCtbsY − 1.
rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1.
single_slice_per_subpic_flag equal to 1 specifies that each subpicture consists of one and only one rectangular slice. single_slice_per_subpic_flag equal to 0 specifies that each subpicture may consist of one or more rectangular slices. When not present, the value of single_slice_per_subpic_flag is inferred to be equal to 0.
tile_idx_delta_present_flag equal to 0 specifies that tile_idx_delta[ i ] syntax elements are not present in the PPS and all pictures referring to the PPS are partitioned into rectangular slice rows and rectangular slice columns in slice raster order. tile_idx_delta_present_flag equal to 1 specifies that tile_idx_delta[ i ] syntax elements may be present in the PPS and all rectangular slices in pictures referring to the PPS are specified in the order indicated by the values of the tile_idx_delta[ i ] in increasing values of i. When not present, the value of tile_idx_delta_present_flag is inferred to be equal to 0.
slice_width_in_tiles_minus1[ i ] plus 1 specifies the width of the i-th rectangular slice in units of tile columns. The value of slice_width_in_tiles_minus1[ i ] shall be in the range of 0 to NumTileColumns − 1, inclusive.
When i is less than num_slices_in_pic_minus1 and NumTileColumns is equal to 1, the value of slice_width_in_tiles_minus1[ i ] is inferred to be equal to 0.
slice_height_in_tiles_minus1[ i ] plus 1 specifies the height of the i-th rectangular slice in units of tile rows when num_exp_slices_in_tile[ i ] is equal to 0. The value of slice_height_in_tiles_minus1[ i ] shall be in the range of 0 to NumTileRows − 1, inclusive.
When i is less than num_slices_in_pic_minus1 and slice_height_in_tiles_minus1[ i ] is not present, it is inferred to be equal to NumTileRows == 1 ? 0 : slice_height_in_tiles_minus1[ i − 1 ].
num_exp_slices_in_tile[ i ] specifies the number of explicitly provided slice heights for the slices in the tile containing the i-th slice (i.e., the tile with tile index equal to SliceTopLeftTileIdx[ i ]). The value of num_exp_slices_in_tile[ i ] shall be in the range of 0 to RowHeight[ SliceTopLeftTileIdx[ i ] / NumTileColumns ] − 1, inclusive. When not present, the value of num_exp_slices_in_tile[ i ] is inferred to be equal to 0.
exp_slice_height_in_ctus_minus1[ i ][ j ] plus 1 specifies the height of the j-th rectangular slice in the tile containing the i-th slice in units of CTU rows. The value of exp_slice_height_in_ctus_minus1[ i ][ j ] shall be in the range of 0 to RowHeight[ SliceTopLeftTileIdx[ i ] / NumTileColumns ] − 1, inclusive.

TABLE 2-continued tile_idx_delta[ i ] specifies the difference between the tile index of the file containing the first CTU in the (i + 1)-th
rectangular slice and the tile index of the file containing the first CTU in the i-th rectangular slice. The value of
tile_idx_delta[ i ] shall be in the range of –NumTilesInPic + 1 to NumTilesInPic – 1, inclusive. When not present, the
value of tile_idx_delta[ i ] is inferred to be equal to 0. When present, the value of tile_idx_delta[ i ] shall not be equal
to 0.
loop_filter_across_tiles_enabled_flag equal to 1 specifies that in-loop filtering operations may be performed across
tile boundaries in pictures referring to the PPS. loop_filter_across_tiles_enabled_flag equal to 0 specifies that in-loop
filtering operations are not performed across tile boundaries in pictures referring to the PPS. The in-loop filtering
operations include the deblocking filter, sample adaptive offset filter, and adaptive loop filter operations. When not
present, the value of loop_filter_across_tiles_enabled_flag is inferred to be equal to 1.
loop_filter_across_slices_enabled_flag equal to 1 specifies that in-loop filtering operations may be performed across
slice boundaries in pictures referring to the PPS. loop_filter_across_slice_enabled_flag equal to 0 specifies that in-
loop filtering operations are not performed across slice boundaries in pictures referring to the PPS. The in-loop filtering
operations include the deblocking filter, sample adaptive offset filter, and adaptive loop filter operations. When not
present, the value of loop_filter_across_slices_enabled_flag is inferred to be equal to 0.

According to the existing embodiment, tile-related information and slice-related information may be signaled as follows.

First, image information obtained through a bitstream may include a no-picture partition flag. The no-picture partition flag may be related to whether no-picture partitioning is applied to a current picture. That is, the no-picture partition flag may indicate/represent whether no-picture partitioning is applied to a current picture.

For example, the no-picture partition flag may be expressed as a syntax element of no_pic_partition_flag. For example, the no_pic_partition_flag syntax element may specify whether no-picture partitioning is applied to a current picture.

For example, when a value of the no-picture partition flag is 0, CTU size information, information on the number of tile columns, information on the number of tile rows, tile column width information according to information on the number of tile columns, and tile row height information according to information the number of tile rows, a rectangular slice flag, a single slice flag, information on the number of slices, a tile index delta presence flag, tile-unit slice width information, tile-unit slice height information, information on the number of slices in a tile, CTU-unit slice height information, tile index delta information, a loop filter tile boundary enable flag, and a loop filter slice boundary enable flag may be configured/included in the PPS.

When the value of the no-picture partition flag is 1, the CTU size information, the information on the number of tile columns, the information on the number of tile rows, the tile column width information according to the information on the number of tile columns, the tile row height information according to the information the number of tile rows, the rectangular slice flag, the single slice flag, the information on the number of slices, the tile index delta presence flag, the tile-unit slice width information, the tile-unit slice height informationt, the information on the number of slices in a tile, the CTU-unit slice height information, the tile index delta information, the loop filter tile boundary enable flag, and the loop filter slice boundary enable flag may not exist.

The CTU size information may be related to a size of a luma coding tree block (CTB) of each CTU. That is, a value resulting from adding 5 to a value of the CTU size information may indicate/represent a size of a luma coding tree block of each CTU.

For example, the CTU size information may be expressed as a syntax element of pps_log2_ctu_size_minus5. For example, a value resulting from adding 5 to a value of pps_log2_ctu_size_minus5 may specify a size of a luma coding tree block of each CTU.

The information on the number of tile columns may be related to the number of tile column widths. That is, a value resulting from adding 1 to a value of the information on the number of tile columns may indicate/represent the number of tile column widths.

For example, the information on the number of tile columns may be expressed as a syntax element of num_exp_tile_columns_minus1. For example, a value resulting from adding 1 to a value of num_exp_tile_columns_minus1 may specify the number of tile column widths.

The information on the number of tile rows may be related to the number of tile row heights. That is, a value resulting from adding 1 to a value of the information on the number of tile rows may indicate/represent the number of tile row heights.

For example, the information on the number of tile rows may be expressed as a syntax element of num_exp_tile_rows_minus1. For example, a value resulting from adding 1 to a value of num_exp_tile_rows_minus1 may specify the number of tile row heights.

The tile column width information may be related to a width of each tile column in units of CTB. That is, a value resulting from adding 1 to a value of the tile column width information may indicate/represent a width of each tile column in units of CTB.

For example, the tile column width information may be expressed as a syntax element of tile_column_width_minus1. For example, a value resulting from adding 1 to a value of tile_column_width_minus1 may specify a width of each tile column in units of CTB.

The tile row height information may be related to a height of each tile row in units of CTB. That is, a value resulting from adding 1 to a value of the tile row height information may indicate/represent a height of each tile row in units of CTB.

For example, the tile row height information may be expressed as a syntax element of tile_row_height_minus1. For example, a value resulting from adding 1 to a value of tile_row_height_minus1 may specify a height of each tile row in units of CTB.

For example, when the number of tiles in a current picture is derived as a value greater than 1, the rectangular slice flag may be configured/included in the PPS. When the number of tiles in a current picture is derived as 1, the rectangular slice flag may not exist. When the rectangular slice flag does not exist, a value of the rectangular slice flag may be derived as 1.

The rectangular slice flag may be related to whether tiles in each slice constitute a rectangular region in a current picture. That is, the rectangular slice flag may indicate/indicate whether tiles in each slice form a rectangular region in a current picture.

For example, the rectangular slice flag may be expressed as a syntax element of rect_slice_flag. For example, the syntax element of rect_slice_flag may specify whether tiles in each slice form a rectangular region in a current picture.

For example, when a value of the rectangular slice flag is 1, the single slice flag may be configured/included in the PPS. When the value of the rectangular slice flag is 0, the single slice flag may not exist. When the single slice flag does not exist, a value of the single slice flag may be derived as 0.

The single slice flag may be related to whether each subpicture is composed of only one slice. That is, the single slice flag may indicate/represent whether each subpicture is composed of only one slice.

For example, the single slice flag may be expressed as a syntax element of single_slice_per_subpic_flag. For example, the syntax element of single_slice_per_subpic_flag may specify whether each subpicture is composed of only one slice.

For example, when a value of the rectangular slice flag is 1 and a value of the single slice flag is 0, the information on the number of slices, the tile index delta presence flag, the tile-unit slice width information, the tile-unit slice height information, the information on the number of slices in a tile, the CTU-unit slice height information, and the tile index delta information may be configured/included in the PPS. When the value of the rectangular slice flag is not 1 or the value of the single slice flag is 1, the information on the number of slices, the tile index delta presence flag, the tile-unit slice width information, the tile-unit slice height information, the information on the number of slices in a tile, the CTU-unit slice height information, and the tile index delta information may not exist.

The information on the number of slices may be related to the number of rectangular slices in a current picture. That is, a value resulting from adding 1 to the information on the number of slices may indicate/represent the number of rectangular slices in a current picture.

For example, the information on the number of slices may be expressed as a syntax element of num_slices_in_pic_minus1. For example, a value resulting from adding 1 to a value of num_slices_in_pic_minus1 may specify the number of rectangular slices in a current picture.

For example, when a value of the information on the number of slices is greater than 0, the tile index delta presence flag may be configured/included in the PPS. When the value of the information on the number of slices is 0, the tile index delta presence flag may not exist. When the tile index delta presence flag does not exist, a value of the tile index delta presence flag may be derived as 0.

The tile index delta presence flag may be related to whether the tile index delta information is signaled. That is, the tile index delta presence flag may indicate/represent whether the tile index delta information is signaled.

For example, the tile index delta presence flag may be expressed as a syntax of tile_idx_delta_present_flag. For example, the syntax element of tile_idx_delta_present_flag may specify whether to signal the tile index delta information.

For example, when the number of tile columns for the current picture is derived as a value greater than 1, the tile-unit slice width information may be configured/included in the PPS. When the number of tile columns for the current picture is derived as 1, a value of the tile-unit slice width information may be derived as 0.

The tile-unit slice width information may be related to a width of each rectangular slice in units of tile columns. That is, a value resulting from adding 1 to a value of the tile-unit slice width information may indicate/represent a width of each rectangular slice in units of tile columns.

For example, the tile-unit slice width information may be expressed as a syntax element of slice_width_in_tiles_minus1. For example, a value resulting from adding 1 to a value of slice_width_in_tiles_minus1 may specify a width of each rectangular slice in units of tile columns.

For example, when the number of tile rows for the current picture is derived as a value greater than 1, the tile-unit slice height information may be configured/included in the PPS. When the number of tile rows for the current picture is derived as 1, a value of the tile-unit slice height information may be derived as 0.

The tile-unit slice height information may be related to a height of each rectangular slice in units of tile rows. That is, a value resulting from adding 1 to a value of the tile-unit slice height information may indicate/represent a height of each rectangular slice in units of tile rows.

For example, the tile-unit slice height information may be expressed as a syntax element of slice_height_in_tiles_minus1. For example, a value resulting from adding 1 to a value of slice_height_in_tiles_minus1 may specify a height of each rectangular slice in units of tile rows.

For example, when a value of the tile-unit slice width information is 0 and a value of the tile-unit slice height information is 0, the information on the number of slices in a tile may be configured/included in the PPS. When the value of the tile-unit slice width information is not 0 or the value of the tile-unit slice height information is not 0, the information on the number of slices in a tile may not exist.

The information on the number of slices in a tile may be related to a height of a rectangular slice in a tile including the corresponding slice in units of CTU rows. That is, a value resulting from adding 1 to a value of the information on the number of slices in a tile may indicate/represent a height of a rectangular slice in a tile including a specific slice in units of CTU rows.

For example, the information on the number of slices in a tile may be expressed as a syntax element of exp_slice_height_in_ctus_minus1. For example, a value resulting from adding 1 to a value of exp_slice_height_in_ctus_minus1 may specify a height of a rectangular slice in a tile including a specific slice in units of CTU rows.

For example, when a value of the tile index delta presence flag is 1, the tile index delta information may be configured/included in the PPS. When the value of the tile index delta presence flag is 0, the tile index delta presence flag may not exist. When the tile index delta presence flag does not exist, the value of the tile index delta presence flag may be derived as 0.

The tile index delta presence flag may be related to whether a difference value between tile indices including the first CTUs of two slices is signaled. That is, the tile index delta presence flag may indicate/represent whether a difference value between tile indices including the first CTUs of two slices is signaled.

For example, the tile index delta presence flag may be expressed as a syntax element of tile_idx_delta. For example, the syntax element of tile_idx_delta may specify whether a difference value between tile indices including the first CTUs of two slices is signaled.

The loop filter tile boundary enable flag may be related to whether an in-loop filter operation is performed on a tile boundary within a current picture. That is, the loop filter tile boundary enable flag may indicate/represent whether an in-loop filter operation is performed on a tile boundary within a current picture.

For example, the loop filter tile boundary enable flag may be expressed as a syntax element of loop_filter_across_tiles_enabled_flag. For example, the syntax element of loop_ filter_across_tiles_enabled_flag may specify whether an in-loop filter operation is performed on a tile boundary within a current picture.

The loop filter slice boundary enable flag may be related to whether an in-loop filter operation is performed on a slice boundary within a current picture. That is, the loop filter slice boundary enable flag may indicate/represent whether an in-loop filter operation is performed on a slice boundary within a current picture.

For example, the loop filter slice boundary enable flag may be expressed as a syntax element of loop_filter_across_slices_enabled_flag. For example, the syntax element of loop_filter_across_slices_enabled_flag may specify whether an in-loop filter operation is performed on a slice boundary within a current picture.

However, the existing signaling mechanism of tile-related information and/or slice-related information by picture partitioning includes the following problems.

First, when pictures referring to PPS are partitioned, but there is only one tile in a picture, and slices in a picture are rectangular slices, the current signaling mechanism is designed to signal information on the number of slices in a picture. In addition, it includes a separate process of deriving the number of slices within a picture at the same time, which is a redundant process that can be removed, and it may cause a problem that a value of signaled information on the number of slices in a picture is not consistent with the derived number of slices in a picture.

Second, the signaling efficiency of picture partitioning can be further improved. That is, there is a problem that signaling of related information may be repeatedly performed in any part of a picture, and information related to partitioning of a picture is not necessarily limited to the right and bottom parts of a specific part of a picture.

In this regard, embodiments of the present disclosure may include one or more of the following features.

1) When pictures referring to PPS are partitioned (e.g., a value of a syntax element of no_pic_partition_flag is 0), but only one tile exists in a picture, and slices in a picture are specified as rectangular slices (e.g., a value of a syntax element of rect_slice_flag is 1), the number of rectangular slices in a picture referring to PPS may be constrained to be derived as a value greater than 1.

2) When pictures referring to PPS are partitioned (e.g., a value of a syntax element of no_pic_partition_flag is 0), but only one tile exists in a picture, and slices in a picture are specified as rectangular slices (e.g., a value of a syntax element of rect_slice_flag is 1), the number of rectangular slices in a picture referring to PPS is not signaled and may be derived as a value equal to the number of slices in the first tile, which is only one tile in a picture.

3) Or, when pictures referring to PPS are partitioned (e.g., a value of a syntax element of no_pic_partition_flag is 0), only one tile exists in a picture, and slices in a picture are specified as rectangular slices (e.g., a value of a syntax element of rect_slice_flag is 1), a value resulting from adding 1 to a value of num_slices_in_pic_minus1 related to the number of slices in a picture may be constrained to be equal to a value resulting from subtracting 1 from NumSlicesInTile[0], which is a variable related to the number of slices in a tile including the first (0-th index) slice.

4) Or, if pictures referring to PPS are partitioned (e.g., a value of a syntax element of no_pic_partition_flag is 0), only one tile exists in a picture, and slices in a picture are specified as rectangular slices (e.g., a value of a syntax element of rect_slice_flag is 1), a syntax element of a new flag included in another signaling layer may be used. That is, a new syntax element of single_tile_per_pic_flag may be signaled. When the syntax element of single_tile_per_pic_flag is available, it may indicate that a picture includes only one tile. Additionally, when the syntax element of single_tile_per_pic_flag is available, additional syntax elements indicating the number of slices in a tile and an explicit height of each of slices in a tile may be signaled/parsed.

5) Or, when pictures referring to PPS are partitioned (e.g., a value of a syntax element of no_pic_partition_flag is 0), but only one tile exists in a picture, and slices in a picture are specified as rectangular slices (e.g., a value of a syntax element of rect_slice_flag is 1), signaling of related information may be repeated based on the number of tiles in a picture instead of the number of slices in a picture. In this case, an additional process may be required in terms of mapping slices to tiles.

6) When pictures referring to PPS are partitioned (e.g., a value of a syntax element of no_pic_partition_flag is 0), but only one tile exists in a picture, and slices in a picture are specified as rectangular slices (e.g., a value of a syntax element of rect_slice_flag is 1), a syntax element of tile_idx_delta_present_flag related to whether tile index delta information is signaled does not exist, and a value of a syntax element of tile_idx_delta_present_flag may be derived as 0.

7) In signaling of a tile structure, i) is_column_freq_info_present_flag, which is a syntax element indicating tile column frequency information, and is_row_freq_info_present_flag, which is a syntax element indicating tile row frequency information, may be signaled. ii) When any one of is_column_freq_info_present_flag and is_row_freq_info_present_flag is available, frequency distribution information related to a tile column interval and/or a tile row interval may exist. This aims to find redundant signaling in signaling of information related to picture partitioning. Other methods may be applied to find redundant signaling.

According to an embodiment proposed in the present disclosure, tile-related information and slice-related information may be signaled as follows.

In this regard, according to the embodiment, the PPS may include the syntax of Table 3 below. The syntax of Table 3 below may be a part of the PPS.

TABLE 3

| | Descriptor |
|---|---|
| pic_parameter_set_rbsp( ) { | |
|   pps_pic_parameter_set_id | ue(v) |
|   . . . | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       if( NumTilesInPic > 1 ) { | |
|         num_slices_in_pic_minus1 | ue(v) |
|         if( num_slices_in_pic_minus1 > 0 ) | |
|           tile_idx_delta_present_flag | u(1) |
|       } | |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && ( tile_idx_delta_present_flag \|\| | |
|           SliceTopLeftTileIdx[ i ] % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] = = 0 && | |
|           RowHeight[ SliceTopLeftTileIdx[ i ] / NumTileColumns ] > 1 ) { | |
|           num_exp_slices_in_tile[ i ] | ue(v) |
|           for( j = 0; j < num_exp_slices_in_tile[ i ]; j++ ) | |
|             exp_slice_height_in_ctus_minus1[ i ][ j ] | ue(v) |
|           i += NumSlicesInTile[ i ] − 1 | |
|         } | |
|         if( tile_idx_delta_present_flag && i < num_slices_in_pic_minus1 ) | |
|           tile_idx_delta[ i ] | se(v) |
|       } | |
|     } | |
|     loop_filter_across_tiles_enabled_flag | u(1) |
|     loop_filter_across_slices_enabled_flag | u(1) |
|   } | |
|   . . . | |
| } | |

Here, semantics of syntax elements included in the syntax of Table 3 may be represented, for example, as shown in Table 4 below. In addition, semantics of syntax elements not shown in Table 4 below among syntax elements included in the syntax of Table 3 may be represented, for example, as shown in Table 2 above.

TABLE 4 rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpic_info_present_flag is equal to 1, the value of rect_slice_flag shall be equal to 1. When no_pic_partition_flag is equal to 0, NumTilesInPic is equal to 1, and rect_slice_flag is equal to 1, it is a constraint of conformance bitstream that the number of slice in pictures referring to the PPS shall be greater than 1.
num_slices_in_pic_minus1 plus 1 specifies the number of rectangular slices in each picture referring to the PPS. The value of num_slices_in_pic_minus1 shall be in the range of 0 to MaxSlicesPerPicture − 1, inclusive, where MaxSlicesPerPicture is specified in Annex A. When no_pic_partition_flag is equal to 1, the value of num_slices_in_pic_minus1 is inferred to be equal to 0. When single_slice_per_subpic_flag is equal to 1, the value of num_slices_in_pic_minus1 is inferred to be equal to sps_num_subpics_minus1. When num_slices_in_pic_minus1 not present and NumTilesInPic is equal to 1 and no_pic_partition_flag is equal to 0, the value of num_slices_in_pic_minus1 is inferred to be equal to 1.
The variable NumSlicesInPicMinus1 is set equal to num_slices_in_pic_minus1.
When no_pic_partition_flag is equal to 0 and rect_slice_flag is equal to 1 and the NumTilesInPic is equal to 1, the variable NumSlicesInPicMinus1 is set equal to NumsSlicesInTile[ 0 ] − 1.
When rect_slice_flag is equal to 1, the list NumCtusInSlice[ i ] for i ranging from 0 to NumSlicesInPicMinus1, inclusive, specifying the number of CTUs in the i-th slice, the list SliceTopLeftTileIdx[ i ] for i ranging from 0 to NumSlicesInPicMinus1, inclusive, specifying the tile index of the file containing the first CTU in the slice, and the matrix CtbAddrInSlice[ i ][ j ] for i ranging from 0 to NumSlicesInPicMinus1, inclusive, and j ranging from 0 to NumCtusInSlice[ i ] − 1, inclusive, specifying the picture raster scan address of the j-th CTB within the i-th slice, and the variable NumSlicesInTile[ i ], specifying the number of slices in the file containing the i-th slice, are derived as follows:

TABLE 4-continued

```
if( single_slice_per_subpic_flag ) {
    for( i = 0; i <= sps_num_subpics_minus1; i++ ) {
        NumCtusInSlice [ i ] = 0
        if( subpicHeightLessThanOneTileFlag[ i ] ) /* The slice consists of a number of CTU rows in a tile.
*/
            AddCtbsToSlice( i, subpic_ctu_top_left_x[ i ],
                subpic_ctu_top_left_x[ i ] + subpic_width_minus1[ i ] + 1, subpic_ctu_top_left_y[ i ],
                subpic_ctu_top_left_y[ i ] + subpic_height_minus1[ i ] + 1 )
        else { /* The slice consists of a number of complete tiles covering a rectangular region. */
            tileX = CtbToTileColBd[ subpic_ctu_top_left_x[ i ] ]
            tileY = CtbToTileRowBd[ subpic_ctu_top_left_y[ i ] ]
            for( j = 0; j < SubpicHeightInTiles[ i ]; j++ )
                for( k = 0; k < SubpicWidthInTiles[ i ]; k++ )
                    AddCtbsToSlice( i, tileColBd[ tileX + k ], tileColBd[ tileX + k + 1 ],
tileRowBd[ tileY + j ],
                        tileRowBd[ tileY + j + 1 ] )
        }
    }
} else {
    tileIdx = 0
    for( i = 0; i <= num_slices_in_pic_minus1; i++ )
        NumCtusInSlice [ i ] = 0
    for( i = 0; i <= num_slices_in_pic_minus1; i++ ) {
        SliceTopLeftTileIdx[ i ] = tileIdx
        tileX = tileIdx % NumTileColumns
        tileY = tileIdx / NumTileColumns
        if( i < num_slices_in_pic_minus1 ) {
            sliceWidthInTiles[ i ] = slice_width_in_tiles_minus1[ i ] + 1
            sliceHeightInTiles[ i ] = slice_height_in_tiles_minus1[ i ] + 1
        } else {
            sliceWidthInTiles[ i ] = NumTileColumns − tileX
            sliceHeightInTiles[ i ] = NumTileRows − tileY
            NumSlicesInTile[ i ] = 1
        }
if( slicWidthInTiles[ i ] = = 1 && sliceHeightInTiles[ i ] = = 1 ) {                      (30)
    if( num_exp_slices_in_tile[ i ] = = 0 ) {
        NumSlicesInTile[ i ] = 1
        sliceHeightInCtus[ i ] = RowHeight[ SliceTopLeftTileIdx[ i ] / NumTileColumns ]
    } else {
        remainingHeightInCtbsY = RowHeight[ SliceTopLeftTileIdx[ i ] / NumTileColumns ]
        for( j = 0; j < num_exp_slices_in_tile[ i ] − 1; j++ ) {
            sliceHeightInCtus[ i + j ] = exp_slice_height_in_ctus_minus1[ i ][ j ] + 1
            remainingHeightInCtbsY −= sliceHeightInCtus[ i + j ]
        }
        uniformSliceHeight = exp_slice_height_in_ctus_minus1[ i ][ j ] + 1
        while( remainingHeightInCtbsY >= uniformSliceHeight ) {
            sliceHeightInCtus[ i + j ] = uniformSliceHeight
            remainingHeightInCtbsY −= uniform SliceHeight
            j++
        }
        if( remainingHeightInCtbsY > 0 ) {
            sliceHeightInCtus[ i + j ] = remainingHeightinCtbsY
            j++
        }
        NumSlicesInTile[ i ] = j
    }
    ctbY = tileRowBd[ tileY ]
    for( j = 0; j < NumSlicesInTile[ i ]; j++ ){
        AddCtbsToSlice( i + j, tileColBd[ tileX ], tileColBd[ tileX + 1 ].
            ctbY, ctbY + sliceHeightInCtus[ i + j ] )
        ctbY += sliceHeightInCtus[ i + j ]
    }
    i += NumSlicesInTile[ i ] − 1
} else
    for( j = 0; j < sliceHeightInTiles[ i ]; j++ )
        for( k = 0; k < sliceWidthInTiles[ i ]; k++ )
            AddCtbsToSlice( i, tileColBd[ tileX + k ], tileColBd[ tileX + k + 1 ],
                tileRowBd[ tileY + j ], tileRowBd[ tileY + j + 1 ])
if( i < NumSlicesInPicMinus1 ) {
    if( tile_idx_delta_present_flag )
        tileIdx += tile_idx_delta[ i ]
    else {
        tileIdx += sliceWidthInTiles[ i ]
        if( tileIdx % NumTileColumns = = 0 )
            tileIdx += ( sliceHeightInTiles[ i ] − 1 ) * NumTileColumns
    }
}
    }
}
}
```

Where the function AddCtbsToSlice( sliceIdx, startX, stopX, startY, stopY) is specified as follows: [Ed. (YK):

TABLE 4-continued

```
Consider defining this function in a style consistent with other functions defined in the spec.]
    for( ctbY = start Y; ctbY < stopY; ctbY++ )
        for( ctbX = startX; ctbX < stopX; ctbX++ ) {
            CtbAddrInSlice[ sliceIdx ][ NumCtusInSlice[ sliceIdx ] ] = ctbY * PicWidthInCtbsY + ctbX        (31)
            NumCtusInSlice[ sliceIdx ]++
        }
It is a requirement of bitstream conformance that the values of NumCtusInSlice[ i ] for i ranging from 0 to
NumSlicesInPicMinus1, inclusive, shall be greater than 0. Additionally, it is a requirement of bitstream
conformance that the matrix CtbAddrInSlice[ i ][ j ] for i ranging from 0 to NumSlicesInPicMinus1, inclusive, and j
ranging from 0 to NumCtusInSlice[ i ] − 1, inclusive, shall include each of all CTB addresses in the range of 0 to
PicSizeInCtbsY − 1, inclusive, once and only once.
The list NumSlicesInSubpic[ i ], specifying the number of rectangular slices in the i-th subpicture, is derived as
follows:
    for( i = 0; i <= sps_num_subpics_minus1; i++ ) {
        NumSlicesInSubpic[ i ] = 0
        for( j = 0; j <= NumSlicesInPicMinus1; j++ ) {
            posX = CtbAddrInSlice[ j ][ 0 ] % PicWidthInCtbsY
            posY = CtbAddrInSlice[ j ][ 0 ] / PicWidthInCtbsY
            if ( posX >= subpic_ctu_top_left_x[ i ] ) &&                                                     (32)
                ( posX < subpic_ctu_top_left_x[ i ] + subpic_width_minus1[ i ] + 1 ) &&
                ( posY < subpic_ctu_top_left_y[ i ] + subpic_height_minus1[ i ] + 1 ) )
            NumSlicesInSubpic[ i ]++
    }
```

That is, according to the embodiment, image information obtained through a bitstream may include the no-picture partition flag. When a value of the no-picture partition flag is 0, tile-related information and slice-related information may be configured/included in the PPS. When the value of the no-picture partition flag is 1, the tile-related information and the slice-related information may not exist.

For example, the slice-related information may include the rectangular slice flag. When a value of the no-picture partition flag is 1, the rectangular slice flag may not exist. When the rectangular slice flag does not exist, a value of the rectangular slice flag may be derived as 1.

In this regard, when a value of the no-picture partition flag is 0, the number of at least one tile in the current picture is derived as 1, and a value of the rectangular slice flag is 1, the number of at least one slice in the current picture may be constrained to be derived as a value greater than 1.

Here, the number of the at least one tile in the current picture may be related to a variable of NumTilesInPic. That is, a variable of NumTilesInPic may specify the number of the at least one tile.

Also, according to the embodiment, when the number of the at least one tile is derived as a value greater than 1, the slice-related information may include information on the number of slices and the tile index delta presence flag.

Here, the tile index delta presence flag may be configured/included in the PPS when a value of the information on the number of slices is greater than 0.

When the number of the at least one tile is derived as 1, the information on the number of slices and the tile index delta presence flag may not exist.

For example, when information on the number of slices does not exist, a value of information on the number of slices may be derived as 1. That is, when a value of the no-picture partition flag is 0, the number of the at least one tile is derived as 1, and the information on the number of slices does not exist, a value of the information on the number of slices may be derived as 1.

For example, when a value of the information on the number of slices is derived, a value resulting from subtracting 1 from the number of the at least one slice may be set equal to a value of the information on the number of slices. That is, a value resulting from subtracting 1 from the number of the at least one slice may be set equal to a value of the information on the number of slices.

Here, the number of the at least one slice may be related to a variable of NumSlicesInPicMinus1. That is, a variable of NumSlicesInPicMinus1 may specify a value resulting from subtracting 1 from the number of the at least one slice in the current picture. For example, a variable of NumSlicesInPicMinus1 may be set equal to a value of the information on the number of slices.

In this regard, the number of slices in a tile including the first slice in the current picture may be derived based on the slice-related information. Here, the number of slices in a tile including the first slice in the current picture may be related to a variable of NumSlicesInTile[0]. That is, a variable of NumSlicesInTile[i] may specify the number of slices in a tile including the i-th slice in the current picture.

For example, when a value of the no-picture partition flag is 0, the number of the at least one tile is derived as 1, and a value of the rectangular slice flag is 1, a value resulting from subtracting 1 from the number of the at least one slice may be set equal to a value resulting from subtracting 1 from the number of slices in a tile including the first slice in the current picture. That is, when a value of the no-picture partition flag is 0, the number of the at least one tile is derived as 1, and a value of the rectangular slice flag is 1, a variable of NumSlicesInPicMinus1 may be set equal to a value resulting from subtracting 1 from a variable of NumSlicesInTile[0].

For example, when the tile index delta presence flag does not exist, a value of the tile index delta presence flag may be derived as 0.

In this way, as in the embodiment, unnecessary redundant signaling may be removed by signaling the information on the number of slices and the tile index delta presence flag only when the number of the at least one tile is greater than 1. It is possible to increase overall coding efficiency by reducing the number of bits allocated for signaling through this.

According to another embodiment proposed in the present disclosure, tile-related information and slice-related information may be signaled as follows.

In this regard, according to the embodiment, the PPS may include the syntax of Table 5 below. The syntax of Table 5 below may be a part of the PPS.

TABLE 5

|  | Descriptor |
|---|---|
| pic_parameter_set_rbsp( ) { |  |
|   pps_pic_parameter_set_id | ue(v) |
|   . . . |  |
|   no_pic_partition_flag | u(1) |
|   if( !no_pic_partition_flag ) { |  |
|     pps_log2_ctu_size_minus5 | u(2) |
|     single_tile_per_pic_flag | u(1) |
|     if( single_tile_per_pic_flag ) { |  |
|       num_slices_in_single_tile_minus1 | ue(v) |
|       if( num_slices_in_single_tile_minus1 > 0 ) { |  |
|         for ( j = 0; j < num_slices_in_single_tile_minus1; j++ ) |  |
|           exp_slice_height_in_single_tile_minus1[ j ] | ue(v) |
|       } |  |
|     } else { |  |
|       num_exp_tile_columns_minus1 | ue(v) |
|       num_exp_tile_rows_minus1 | ue(v) |
|       for( i = 0; i <= num_exp_tile_columns_minus1; i++ ) |  |
|         tile_column_width_minus1[ i ] | ue(v) |
|       for( i = 0; i <= num_exp_tile_rows_minus1; i++ ) |  |
|         tile_row_height_minus1[ i ] | ue(v) |
|       if( NumTilesInPic > 1 ) |  |
|         rect_slice_flag | u(1) |
|       if( rect_slice_flag ) |  |
|         single_slice_per_subpic_flag | u(1) |
|       if( rect_slice_flag && !single_slice_per_subpic_flag ) |  |
|         num_slices_in_pic_minus1 | ue(v) |
|       if( num_slices_in_pic_minus1 > 0 ) |  |
|         tile_idx_delta_present_flag | u(1) |
|       for( i = 0; i < num_slices_in_pic_minus1; i++ ) { |  |
|         if( NumTileColumns > 1 ) |  |
|           slice_width_in_tiles_minus1[ i ] | ue(v) |
|         if( NumTileRows > 1 && ( tile_idx_delta_present_flag \|\| |  |
|           SliceTopLeftTileIdx[ i ] % NumTileColumns = = 0 ) ) |  |
|           slice_height_in_tiles_minus1[ i ] | ue(v) |
|         if( slice_width_in_tiles_minus1[ i ] = = 0 && |  |
|           slice_height_in_tiles_minus1[ i ] = = 0 && |  |
|           RowHeight[ SliceTopLeftTileIdx[ i ] / NumTileColumns ] > 1 ) { |  |
|         num_exp_slices_in_tile[ i ] | ue(v) |
|         for( j = 0; j < num_exp_slices_in_tile[ i ]; j++ ) |  |
|           exp_slice_height_in_ctus_minus1[ i ][ j ] | ue(v) |
|         i += NumSlicesInTile[ i ] − 1 |  |
|         } |  |
|         if( tile_idx_delta_present_flag && i < num_slices_in_pic_minus1 ) |  |
|           tile_idx_delta[ i ] | se(v) |
|       } |  |
|     } |  |
|     for( i = 0; i < num_slices_in_pic_minus1; i++ ) { |  |
|     loop_filter_across_tiles_enabled_flag | u(1) |
|   } |  |
|     loop_filter_across_slices_enabled_flag | u(1) |
|   } |  |
|   . . . |  |
| } |  |

Here, semantics of syntax elements included in the syntax of Table 5 may be represented, for example, as shown in Table 6 below. In addition, semantics of syntax elements not shown in Table 6 below among syntax elements included in the syntax of Table 5 may be represented, for example, as shown in Table 2 above.

TABLE 6 single_tile_per_pic_flag equal to 1 specifies that the picture consists only 1 tile per picture. single_tile_per_pic_flag equal to 0 specifies that each picture may consist of one or more tiles. When not present, the value of single_tile_per_pic_flag is inferred to be equal to 0.

num_slices_in_single_tile_minus1 plus 1 specifies the number of rectangular slices in each picture referring to the PPS. The value of num_slices_in_single_tile_minus1 shall be in the range of 0 to MaxSlicesPerPicture − 1, inclusive, where MaxSlicesPerPicture is specified in Annex A. When no_pic_partition_flag is equal to 1, the value of num_slices_in_single_file_minus1 is inferred to be equal to 0.

exp_slice_height_in_ctus_minus1[ j ] plus 1 specifies the height of the j-th rectangular slice in units of CTU rows. For rectangular slices, the list NumCtusInSlice[ i ] for i ranging from 0 to num_slices_in_pic_minus1, inclusive, specifying the number of CTU in the i-th slice, the list SliceTopLeftTileIdx[ i ] for i ranging from 0 to num_slices_in_pic_minus1, inclusive, specifying the index of the top-left tile of the slice, and the matrix CtbAddrInSlice[ i ][ j ] for i ranging from 0 to num_slices_in_pic_minus1, inclusive, and j ranging from 0 to NumCtusInSlice[ i ] − 1, inclusive, specifying the picture raster scan address of the j-th CTB within the i-th slice, are derived as follows:

if( single_slice_per_subpic_flag ) {

TABLE 6-continued

```
    for( i = 0; i <= sps_num_subpics_minus1; i++ )
        NumCtusInSlice[ i ] = 0
    for( i = 0; i < PicSizeInCtbsY; i++ ) {
        sliceIdx = subpic_info_present_flag ? CtbToSubpicIdx[ i ] : 0
        CtbAddrInSlice[ sliceIdx ][ NumCtusInSlice[ sliceIdx ] ] = i
        NumCtusInSlice[ sliceIdx ]++
    }
} else {
    tileIdx = 0
    if( single_file_per_pic_flag ) {
        for ( j = 0; j < num_slices_in_single_tile_minus1; j++ )
            NumCtusInSlice[ i ] = 0
            AddCtbsToSlice( i, tileColBd[ tileX ], tileColBd[ tileX + 1 ],
                    ctbY, ctbY + exp_slice_height_in_ctus_minus1[ i ] + 1 )
            ctbY += exp_slice_height_in_ctus_minus1 [ i ] + 1
            i++
        }
        AddCtbsToSlice( i, tileColBd[ tileX ], tileColBd[ tileX + 1 ], ctbY, tileRowBd[ tileY + 1 ] )
} else {
  for( i = 0; i <= num_slices_in_pic_minus1; i++ )
    NumCtusInSlice[ i ] = 0
  for( i = 0; i <= num_slices_in_pic_minus1; i++ ) {
    SliceTopLeftTileIdx[ i ] = tileIdx
    tileX = tileIdx % NumTileColumns
    tileY = tileIdx / NumTileColumns
    if( i = = num_slices_in_pic_minus1 ) {
        slice_width_in_tiles_minus1[ i ] = NumTileColumns − 1 − tileX
        slice_height_in_tiles_minus1[ i ] = NumTileRows − 1 − tileY
        NumSlicesInTile[ i ] = 1
    }
    if( slice_width_in_tiles_minus1[ i ] = = 0 && slice_height_in_tiles_minus1[ i ] = = 0 ) {   (29)
        ctbY = tileRowBd[ tileY ]
        for( j = 0; j < NumSlicesInTile[ i ] − 1; j++ ) {
            AddCtbsToSlice( i, tileColBd[ tileX ], tileColBd[ tileX + 1 ].
                    ctbY, ctbY + SliceHeightInCtusMinus1[ i ] + 1 )
            ctbY += SliceHeightInCtusMinus1[ i ] + 1
            i++
        }
        AddCtbsToSlice( i, tileColBd[ tileX ], tileColBd[ tileX + 1 ], ctbY, tileRowBd[ tileY + 1 ] )
    } else
        for( j = 0; j <= slice_height_in_tiles_minus1[ i ]; j++ )
            for( k = 0; k <= slice_width_in_tiles_minus1[ i ]; k++ )
                AddCtbsToSlice( i, tileColBd[ tileX + k ], tileColBd[ tileX + k + 1 ],
                    tileRowBd[ tileY + j ], tileRowBd[ tileY + j + 1 ] )
    if( tile_idx_delta_present_flag )
        tileIdx += tile_idx_delta[ i ]
    else {
        tileIdx += slice_width_in_tiles_minus1[ i ] + 1
        if( tileIdx % NumTileColumns = = 0 )
            tileIdx += slice_height_is_tiles_minus1[ i ] * NumTileColumns
    }
  }
 }
 }
}
```

That is, according to the embodiment, image information obtained through a bitstream may include the no-picture partition flag. When a value of the no-picture partition flag is 0, the tile-related information and the slice-related information may be configured/included in the PPS. When the value of the no-picture partition flag is 1, the tile-related information and the slice-related information may not exist.

For example, the tile-related information may include a single tile picture flag. When a value of the no-picture partition flag is 1, the single tile picture flag may not exist. When the single tile picture flag does not exist, a value of the single tile picture flag may be derived as 0.

The single tile picture flag may be related to whether the current picture is composed of only one tile (single tile). That is, the single tile picture flag may indicate/represent whether the current picture is composed of only one tile.

For example, the single tile picture flag may be expressed as a syntax element of single_tile_per_pic_flag. For example, the syntax element of single_tile_per_pic_flag may specify whether the current picture is composed of only one tile.

For example, when a value of the single tile picture flag is 1, the tile-related information may further include information on the number of slices in a single tile and height information of each of slices in a single tile. When the value of the single tile picture flag is 0, the information on the number of slices in a single tile and the height information of each of slices in a single tile may not exist.

The information on the number of slices in a single tile may be related to the number of rectangular slices in the current picture. That is, a value resulting from adding 1 to a value of the information on the number of slices in a single tile may indicate/represent the number of rectangular slices in the current picture.

For example, the information on the number of slices in a single tile may be expressed as a syntax element of num_slices_in_single_tile_minus1. For example, a value resulting from adding 1 to a value of num_slices_in_single_tile_minus1 may specify the number of rectangular slices in the current picture.

The height information of each of slices in a single tile may be configured/included in the PPS when a value of the information on the number of slices in a single tile is greater than 0.

The height information of each of slices in a single tile may be related to a height of each of rectangular slices in the current picture. For example, the height information of each of slices in a single tile may be related to a height of each of rectangular slices in the current picture in units of CTU rows. That is, a value resulting from adding 1 to a value of the height information of each of slices in a single tile may indicate/represent a height of each of rectangular slices in the current picture. For example, a value resulting from adding 1 to a value of the height information of each of slices in a single tile may indicate/represent a height of each of rectangular slices in the current picture in units of CTU rows.

For example, the height information of each of slices in a single tile may be expressed as a syntax element of exp_slice_height_in_single_tile_minus1. For example, a value resulting from adding 1 to a value of exp_slice_height_in_single_tile_minus1 may specify a height of each of rectangular slices in the current picture.

For example, when a value of the single tile picture flag is 0, the information on the number of tile columns, the information on the number of tile rows, the tile column width information according to the information on the number of tile columns, the tile row height information according to the information the number of tile rows, the rectangular slice flag, the single slice flag, the information on the number of slices, the tile index delta presence flag, the tile-unit slice width information, the tile-unit slice height information, the information on the number of slices in a tile, the CTU-unit slice height information, the tile index delta information, and the loop filter tile boundary enable flag may be configured/included in the PPS.

When the value of the single tile picture flag is 1, the information on the number of tile columns, the information on the number of tile rows, the tile column width information according to the information on the number of tile columns, the tile row height information according to the information the number of tile rows, the rectangular slice flag, the single slice flag, the information on the number of slices, the tile index delta presence flag, the tile-unit slice width information, the tile-unit slice height information, the information on the number of slices in a tile, the CTU-unit slice height information, the tile index delta information, and the loop filter tile boundary enable flag may not exist.

In this way, as in the embodiment, unnecessary redundant signaling may be removed by signaling only information on the number of slices in a single tile and a height of each of slices in a single tile when a value of the single tile picture flag is 1 (i.e., when the current picture is composed of only one tile). It is possible to increase overall coding efficiency by reducing the number of bits allocated for signaling through this.

According to another embodiment proposed in the present disclosure, tile-related information and slice-related information may be signaled as follows.

In this regard, according to the embodiment, the PPS may include the syntax of Table 7 below. The syntax of Table 7 below may be a part of the PPS.

TABLE 7

|  | Descriptor |
|---|---|
| pic_parameter_set_rbsp( ) { | |
| pps_pic_parameter_set_id | ue(v) |
| . . . | |
| no_pic_partition_flag | u(1) |
| if( !no_pic_partition_flag ) { | |
| pps_log2_ctu_size_minus5 | u(2) |
| num_exp_tile_columns_minus1 | ue(v) |
| num_exp_tile_rows_minus1 | ue(v) |
| for( i = 0; i <= num_exp_tile_columns_minus1; i++ ) | |
| tile_column_width_minus1[ i ] | ue(v) |
| for( i = 0; i <= num_exp_tile_rows_minus1; i++ ) | |
| tile_row_height_minus1[ i ] | ue(v) |
| if( NumTilesInPic > 1 ) | |
| rect_slice_flag | u(1) |
| if( rect_slice_flag ) | |
| single_slice_per_subpic_flag | u(1) |
| if( rect_slice_flag && !single_slice_per_subpic_flag ) | |
| num_slices_in_pic_minus1 | ue(v) |
| if( num_slices_in_pic_minus1 > 0 ) | |
| tile_idx_delta_present_flag | u(1) |
| for( i = 0; i < NumTilesInPic; i++ ) { | |
| num_slices_in_tile_minus1[ i ] | ue(v) |
| if( NumSlicesInTile > 1) { | |
| for( j = 0 j <= NumSlicesInTile; j++ ) | |
| exp_slice_height_in_ctus_minus1[ j ] | ue(v) |
| } else { | |
| single_slice_per_tile_flag | u(1) |
| if( !single_slice_per_tile_flag ) | |
| tile_to_slice_map_idx. | ue(v) |
| } | |
| if( tile_idx_delta_present_flag && i < num_slices_in_pic_minus1 ) | |
| tile_idx_delta[ i ] | se(v) |
| } | |
| } | |

TABLE 7-continued

|  | Descriptor |
|---|---|
| loop_filter_across_tiles_enabled_flag | u(1) |
| loop_filter_across_slices_enabled_flag | u(1) |
| } |  |
| . . . |  |
| } |  |

Here, semantics of syntax elements included in the syntax of Table 7 may be represented, for example, as shown in Table 8 below. In addition, semantics of syntax elements not shown in Table 8 below among syntax elements included in the syntax of Table 7 may be represented, for example, as shown in Table 2 above.

TABLE 8 num_slices_in_tile_minus1 plus 1 specifies the number of rectangular slices in each file referring to the PPS. The value of num_slices_in_file_minus1 shall be in the range of 0 to MaxSlicesPerPicture −1, inclusive, where MaxSlicesPerPicture is specified in Annex A. When no_pic_partition_flag is equal to 1, the value of num_slices_in_file_minus1 is inferred to be equal to 0.
The variable NumSlicesInTile; specifies the number of rectangular slices in the tile and can be derived as follows:
NumSlicesInTile = num_slices_in_tile_minus1 + 1
exp_slice_height_in_ctus_minus1[ j ] plus 1 specifies the height of the j-th rectangular slice in the current tile in units of CTU rows. The value of exp_slice_height_in_ctus_minus1[ ] shall be in the range of 0 to RowHeight[ tile Y ] − 1, inclusive, where tileY is the tile row index of the current tile.
single_slice_per_tile_flag equal to 1 specifies that only one slice per tile is present. single_slice_per_tile_flag equal to 0 specifies that the tile may contain one or more slices.
tile_to_slice_map_idx specifies the index of the tile to slice. The length of the syntax element is Ceil( Log2( MaxSlicesPerPicture−1) ) bits.

That is, according to the embodiment, image information obtained through a bitstream may include the no-picture partition flag. When a value of the no-picture partition flag is 0, the tile-related information and the slice-related information may be configured/included in the PPS. When the value of the no-picture partition flag is 1, the tile-related information and the slice-related information may not exist.

For example, the slice-related information may include information on the number of slices in a tile. When a value of the no-picture partition flag is 1, the information on the number of slices in a tile may not exist. When the information on the number of slices in a tile does not exist, a value of the information on the number of slices in a tile may be derived as 0.

The information on the number of slices in a tile may be related to the number of rectangular slices in each tile. That is, a value resulting from adding 1 to a value of the information on the number of slices in a tile may indicate/represent the number of rectangular slices in each tile.

For example, the information on the number of slices in a tile may be expressed as a syntax element of num_slices_in_tile_minus1. For example, a value resulting from adding 1 to a value of num_slices_in_tile_minus1 may specify the number of rectangular slices in each tile.

When the information on the number of slices in a tile is derived, a variable of NumSlicesInTile related to the number of rectangular slices in a tile may be derived as a value resulting from adding 1 to a value of the information on the number of slices in a tile.

For example, when the number of rectangular slices in a tile derived by the information on the number of slices in a tile is greater than 1, the slice-related information may further include slice height information for each of rectangular slices in a tile. When the number of rectangular slices in a tile derived by the information on the number of slices in a tile is not greater than 1, the slice height information for each of rectangular slices in a tile may not exist.

The slice height information for each of rectangular slices in a tile may be related to a height of each of rectangular slices in a current tile in units of CTU rows. That is, a value resulting from adding 1 to a value of the slice height information for each of rectangular slices in a tile may indicate/represent a height of each of rectangular slices in a current tile in units of CTU rows.

For example, the slice height information for each of rectangular slices in a tile may be expressed as a syntax element of exp_slice_height_in_ctus_minus1. For example, a value resulting from adding 1 to a value of exp_slice_height_in_ctus_minus1 may specify a height of each of rectangular slices in a current tile in units of CTU rows.

For example, when the number of rectangular slices in a tile derived by the information on the number of slices in a tile is 1, the slice-related information may further include a single slice tile flag and slice map index information. When the number of rectangular slices in a tile derived by the information on the number of slices in a tile is not 1, the single slice tile flag and the slice map index information may not exist.

The single slice tile flag may be related to whether only one slice exists in each tile. That is, the single slice tile flag may indicate/represent whether only one slice exists in each tile.

For example, the single slice tile flag may be expressed as a syntax element of single_slice_per_tile_flag. For example, the syntax element of single_slice_per_tile_flag may specify whether only one slice (e.g., single slice) exists in each tile.

For example, when a value of the single slice tile flag is 0, the slice-related information may include the slice map index information. When the value of the single slice tile flag is 1, the slice map index information may not exist.

The slice map index information may be related to an index of a tile for a slice. For example, the slice map index information may be related to information of a slice corresponding to each tile. The slice map index information may indicate/represent an index of a tile for a slice. For example, the slice map index information may indicate/represent information of a slice corresponding to each tile.

For example, the slice map index information may be expressed as a syntax element of tile_to_slice_map_idx. For example, the syntax element of tile_to_slice_map_idx may specify an index of a tile for a slice. For example, the syntax element of tile_to_slice_map_idx may specify information of a slice corresponding to each tile.

In this way, as in the above embodiment, signaling efficiency of information related to picture partitioning can be improved by repeating signaling of related information based on each tile in a picture by the number of tiles in a picture instead of the number of slices in a picture.

According to another embodiment proposed in the present disclosure, tile-related information and slice-related information may be signaled as follows.

In this regard, according to the embodiment, the PPS may include the syntax of Table 9 below. The syntax of Table 9 below may be a part of the PPS.

TABLE 9

| | Descriptor |
| --- | --- |
| pic_parameter_set_rbsp( ) { | |
| pps_pic_parameter_set_id | ue(v) |
| . . . | |

TABLE 9-continued

| | Descriptor |
| --- | --- |
| num_exp_tile_columns_minus1 | ue(v) |
| num_exp_tile_rows_minus1 | ue(v) |
| is_column_freq_information_present_flag | u(1) |
| is_row_freq_information_present_flag | u(1) |
|   for( i = 0; i <= num_exp_tile_columns_minus1; i++ ) { | |
|     tile_column_width_minus1[ i ] | ue(v) |
|     if( is_column_freq_information_present_flag ) | |
|       column_freq_count_minus1[ i ] | ue(v) |
|   } | |
|   for( i = 0; i <= num_exp_tile_rows_minus1; i++ ){ | |
|     tile_row_height_minus1[ i ] | ue(v) |
|     if( is_row_freq_information_present_flag ) | |
|       row_freq_count_minus1[ i ] | ue(v) |
|   } | |
| . . . | |
| } | |

Here, semantics of syntax elements included in the syntax of Table 9 may be represented, for example, as shown in Table 10 below. In addition, semantics of syntax elements not shown in Table 10 below among syntax elements included in the syntax of Table 9 may be represented, for example, as shown in Table 2 above.

TABLE 10 num_exp_tile_columns_minus1 plus 1 specifies the unique number of consecutive tile columns widths that are explicitly provided. The value of num_exp_tile_columns_minus1 shall be in the range of 0 to PicWidthInCtbsY − 1, inclusive. When no_pic_partition_flag is equal to 1, the value of num_exp_tile_columns_minus1 is inferred to be equal to 0.
num_exp_tile_rows_minus1 plus 1 specifies the unique number consecutive tile row heights that are explicitly provided. The value of num_exp_tile_rows_minus1 shall be in the range of 0 to PicHeightInCtbsY − 1, inclusive. When no_pic_partition_flag is equal to 1, the value of num_tile_rows_minus1 is inferred to be equal to 0.
column_freq_count_minus1[ i ] plus 1 specifies the frequency count of the ith explicitly signalled tile column value
row_freq_count_minus1[ i ] plus 1 specifies the frequency count of the ith explicitly signalled tile row value
The variable NumTileColumns, specifying the number of tile columns, and the list colWidth[ i ] for i ranging from 0 to NumTileColumn − 1, inclusive, specifying the width of the i-th tile column in units of CTBs, are derived as follows:
  remainingWidthInCtbsY = PicWidthInCtbsY
  for( i = 0; i < num_exp_tile_columns_minus1; i++ ) {
  if( is_column_freq_information_present_flag ){
    while(column_freq_count_minus1[ i ] >0)
      colWidth[ i ] = tile_column_width_minus1[ i ] + 1
      column_freq_count_minus1[ i ] = column_freq_count_minus1[ i ] −1
    }
  } else {
  colWidth[ i ] = tile_column_width_minus1[ i ] + 1
  remainingWidthInCtbsY −= colWidth[ i ]
    }
  }
  uniformTileColWidth = tile_column_width_minus1[ num_exp_file_columns_minus1 ] + 1      (23)
  while( remainingWidthInCtbsY >= uniformTileColWidth ) {
  colWidth[ i++ ] = uniformTileColWidth
  remainingWidthInCtbsY −= uniformTileColWidth
  }
if( remainingWidthInCtbsY > 0 )
colWidth[ i++ ] = remainingWidthInCtbsY
NumTileColumns = i
The variable NumTileRows, specifying the number of tile rows, and the list RowHeight[ j ] for j ranging from 0 to NumTileRows − 1, inclusive, specifying the height of the j-th tile row in units of CTBs, are derived as follows:
  remainingHeightInCtbsY = PicHeightInCtbsY
  for( j = 0; j < num_exp_tile_rows_minus1; j++ ) {
  if( is_row_freq_information_present_flag ){
    while(row_freq_count_minus1[ i ] >0)
      RowHeight[ i ] = tile_row_height_minus1[ i ] + 1
      row_freq_count_minus1[ i ] = row_freq_count_minus1[ i ] −1
    }
  } else {
  RowHeight[ j ] = tile_row_height_minus1[ j ] + 1
  remainingHeightInCtbsY −= RowHeight[ j ]
    }
  }
  uniformTileRowHeight = tile_row_height_minus1[ num_exp_file_rows_minus1 ] + 1      (24)

TABLE 10-continued

```
while( remainingHeightInCtbsY >= uniformTileRowHeight ) {
    RowHeight[ j++ ] = uniformTileRowHeight
    remainingHeightInCtbsY -= uniformTileRowHeight
}
if( remainingHeightInCtbsY > 0 )
    RowHeight[ j++ ] = remainingHeightInCtbsY
NumTileRows = j
```

That is, according to the embodiment, image information obtained through a bitstream may include the no-picture partition flag. When a value of the no-picture partition flag is 0, the tile-related information and the slice-related information may be configured/included in the PPS. When the value of the no-picture partition flag is 1, the tile-related information and the slice-related information may not exist.

For example, the tile-related information may include information on the number of tile columns, a column frequency information presence flag, and tile column width information. When a value of the no-picture partition flag is 1, the information on the number of tile columns, the column frequency information presence flag, and the tile column width information may not exist. When the information on the number of tile columns does not exist, a value of the information on the number of tile columns may be derived as 0.

The information on the number of tile columns may be related to the unique number of widths of consecutive tile columns. That is, a value resulting from adding 1 to a value of the information on the number of tile columns may indicate/represent the unique number of widths of consecutive tile columns.

For example, the information on the number of tile columns may be expressed as a syntax element of num_exp_tile_columns_minus1. For example, a value resulting from adding 1 to a value of num_exp_tile_columns_minus1 may specify the unique number of widths of tile columns.

The column frequency information presence flag may be related to whether the column frequency information is signaled. That is, the column frequency information presence flag may indicate/represent whether the column frequency information is signaled.

For example, the column frequency information presence flag may be expressed as a syntax element of is_column_freq_information_present_flag. For example, the syntax element of is_column_freq_information_present_flag may specify whether to signal the column frequency information (e.g., syntax element of column_freq_count_minus1).

For example, when a value of the column frequency information presence flag is 1, the tile-related information may further include the above-described column frequency information. When the value of the column frequency information presence flag is 0, the column frequency information may not exist.

The column frequency information may be related to a frequency for a width of each tile column according to the unique number of widths of consecutive tile columns. That is, a value resulting from adding 1 to a value of the column frequency information may indicate/represent a frequency for a width of each of tile columns according to the unique number of widths of consecutive tile columns.

For example, the column frequency information may be expressed as a syntax element of column_freq_count_minus1. For example, a value resulting from adding 1 to a value of the syntax element of column_freq_count_minus1 may specify a frequency for a width of each of tile columns according to the unique number of widths of consecutive tile columns.

In this way, as in the above embodiment, unnecessary redundant signaling is removed by signaling frequency distribution information related to a tile column interval. It is possible to increase overall coding efficiency by reducing the number of bits allocated for signaling through this.

Also, for example, the tile-related information may include information on the number of tile rows, a row frequency information presence flag, and tile row height information. When a value of the no-picture partition flag is 1, the information on the number of tile rows, the row frequency information presence flag, and the tile row height information may not exist. When the information on the number of tile rows does not exist, a value of the information on the number of tile rows may be derived as 0.

The information on the number of tile rows may be related to the unique number of heights of consecutive tile rows. That is, a value resulting from adding 1 to a value of the information on the number of tile rows may indicate/represent the unique number of heights of consecutive tile rows.

For example, the information on the number of tile rows may be expressed as a syntax element of num_exp_tile_rows_minus1. For example, a value resulting from adding 1 to a value of the syntax element of num_exp_tile_rows_minus1 may specify the unique number of heights of tile rows.

The row frequency information presence flag may be related to whether the row frequency information is signaled. That is, the row frequency information presence flag may indicate/represent whether the row frequency information is signaled.

For example, the row frequency information presence flag may be expressed as a syntax element of is_row_freq_information_present_flag. For example, the syntax element of is_row_freq_information_present_flag may specify whether to signal the row frequency information (e.g., syntax element of row_freq_count_minus1).

For example, when a value of the row frequency information presence flag is 1, the tile-related information may further include the above-described row frequency information. When the value of the row frequency information presence flag is 0, the row frequency information may not exist.

The row frequency information may be related to a frequency for a height of each of tile rows according to the unique number of heights of consecutive tile rows. That is, a value resulting from adding 1 to a value of the row frequency information may indicate/represent a frequency for a height of each of tile rows according to the unique number of heights of consecutive tile rows.

For example, the row frequency information may be expressed as a syntax element of row_freq_count_minus1. For example, a value resulting from adding 1 to a value of the syntax element of row_freq_count_minus1 may specify a frequency for a height of each of tile rows according to the unique number of heights of consecutive tile rows.

In this way, as in the above embodiment, unnecessary redundant signaling is removed by signaling frequency distribution information related to a tile row interval. It is possible to increase overall coding efficiency by reducing the number of bits allocated for signaling through this.

The following drawings are for explaining a specific example of the present specification. Since the names of specific devices described in the drawings or the names of specific signals/messages/fields are presented by way of example, the technical features of the present specification are not limited to the specific names used in the following drawings.

FIGS. 9 and 10 schematically illustrates examples of a video/image encoding method and related components according to embodiment(s) of the present disclosure. The method disclosed in FIG. 9 may be performed by the encoding apparatus disclosed in FIG. 2. Specifically, for example, S900 and S910 of FIG. 9 may be performed by the image partitioner 210 of the encoding apparatus, and S920 of FIG. 9 may be performed by the entropy encoder 240 of the encoding apparatus. A method disclosed in FIG. 9 may include the embodiments described above in the present disclosure.

Referring to FIG. 9, an encoding apparatus derives at least one tile and at least one slice for a current picture (S900). An encoding apparatus may partition an input image (or picture, frame) into predetermined units. For example, an encoding apparatus may partition an input image in units of tiles or slices. For example, an encoding apparatus may derive at least one tile for the current picture by partitioning an input image in units of tiles. Also, an encoding apparatus may derive at least one slice for the current picture by partitioning an input image in units of slices.

An encoding apparatus generates tile-related information and slice-related information based on the at least one tile and the at least one slice (S910). Also, for example, an encoding apparatus may generate tile-related information, slice-related information, and a no-picture partition flag based on the at least one tile and the at least one slice.

The no-picture partition flag may be related to whether no-picture partitioning is applied to a current picture. That is, the no-picture partition flag may indicate/represent whether no-picture partitioning is applied to a current picture.

For example, the no-picture partition flag may be expressed as a syntax element of no_pic_partition_flag. For example, the syntax element of no_pic_partition_flag may specify whether no-picture partitioning is applied to a current picture.

The tile-related information and the slice-related information may include at least one of CTU size information, information on the number of tile columns, information on the number of tile rows, tile column width information according to the information on the number of tile columns, tile row height information according to the information on the number of tile rows, a rectangular slice flag, a single slice flag, information on the number of slices, a tile index delta presence flag, tile-unit slice width information, tile-unit slice height information, information on the number of slices in a tile, CTU-unit slice height information, tile index delta information, a loop filter tile boundary enable flag, and/or a loop filter slice boundary enable flag. For example, the tile-related information and the slice-related information may include at least one of pps_log2_ctu_size_minus5, num_exp_tile_columns_minus1, num_exp_tile_rows_minus1, tile_column_width_minus1, tile_row_height_minus1, rect_slice_flag, single_slice_per_subpic_flag, num_slices_in_pic_minus1, tile_idx_delta_present_flag, slice_width_in_ tiles_minus1, slice_height_in_tiles_minus1, exp_slice_height_in_ctus_minus1, tile_idx_delta, loop_filter_across_tiles_enabled_flag and/or loop_filter_across_slices_enabled_flag.

An encoding apparatus encodes image/video information (S920). The image/video information may include the tile-related information, the slice-related information, and the no-picture partition flag. In addition, the image/video information may include various information according to an embodiment of the present disclosure. For example, the image/video information may include information disclosed in at least one of Tables 1, 3, 5, 7 and/or 9 described above.

The encoded image/video information may be output in the form of a bitstream. The bitstream may be transmitted to a decoding apparatus through a network or a storage medium.

Specifically, the tile-related information and the slice-related information may include various information according to an embodiment of the present disclosure.

First, the image information may include the no-picture partition flag. When a value of the no-picture partition flag is 0, the tile-related information and the slice-related information may be configured/included in the PPS. When the value of the no-picture partition flag is 1, the tile-related information and the slice-related information may not exist.

When a value of the no-picture partition flag is 1, the rectangular slice flag may not exist. When the rectangular slice flag does not exist, a value of the rectangular slice flag may be derived as 1.

In this regard, when a value of the no-picture partition flag is 0, the number of at least one tile in a current picture is derived as 1, and a value of the rectangular slice flag is 1, the number of at least one slice in the current picture may be constrained to be derived as a value greater than 1.

Here, the number of the at least one tile in the current picture may be related to a variable of NumTilesInPic. That is, the variable NumTilesInPic may specify the number of the at least one tile.

Also, according to the embodiment, when the number of the at least one tile is derived as a value greater than 1, the slice-related information may include information on the number of slices and the tile index delta presence flag.

Here, the tile index delta presence flag may be configured/included in the PPS when a value of the information on the number of slices is greater than 0.

When the number of the at least one tile is derived as 1, the information on the number of slices and the tile index delta presence flag may not exist.

For example, when the information on the number of slices does not exist, a value of information on the number of slices may be derived as 1. That is, when a value of the no-picture partition flag is 0, the number of the at least one tile is derived as 1, and the information on the number of slices does not exist, a value of the information on the number of slices may be derived as 1.

For example, when the value of the information on the number of slices is derived, a value resulting from subtracting 1 from the number of the at least one slice may be set equal to a value of the information on the number of slices. That is, a value resulting from subtracting 1 from the number of the at least one slice may be set equal to the value of the information on the number of slices.

Here, the number of the at least one slice may be related to a variable of NumSlicesInPicMinus1. That is, a variable of NumSlicesInPicMinus1 may specify a value resulting from subtracting 1 from the number of the at least one slice in the current picture. For example, a variable of NumSlicesInPicMinus1 may be set equal to a value of the information on the number of slices.

In this regard, the number of slices in a tile including the first slice in the current picture may be derived based on the slice-related information. Here, the number of slices in a tile including the first slice in the current picture may be related to a variable of NumSlicesInTile[0]. That is, a variable of NumSlicesInTile[i] may specify the number of slices in a tile including the i-th slice in the current picture.

For example, when a value of the no-picture partition flag is 0, the number of the at least one tile is derived as 1, and a value of the rectangular slice flag is 1, a value resulting from subtracting 1 from the number of the at least one slice may be set equal to a value resulting from subtracting 1 from the number of slices in a tile including the first slice in the current picture. That is, when the value of the no-picture partition flag is 0, the number of the at least one tile is derived as 1, and the value of the rectangular slice flag is 1, a variable of NumSlicesInPicMinus1 may be set equal to a value resulting from subtracting 1 from the variable of NumSlicesInTile[0].

For example, when the tile index delta presence flag does not exist, a value of the tile index delta presence flag may be derived as 0.

FIGS. 11 and 12 schematically illustrate examples of an image/video decoding method and related components according to an embodiment of the present disclosure. The method disclosed in FIG. 11 may be performed by the decoding apparatus illustrated in FIG. 3. Specifically, for example, S1100 and S1110 of FIG. 11 may be performed by the entropy decoder 310 of the decoding apparatus, and S1120 may be performed by at least one of the residual processor 320, the predictor 330 and/or adder 340 of the decoding apparatus. The method disclosed in FIG. 11 may include the embodiments described above in the present disclosure.

Referring to FIG. 11, the decoding apparatus receives/obtains image/video information (S1100). The decoding apparatus may receive/obtain the image/video information through a bitstream. The image/video information may include a no-picture partition flag related to whether no-picture partitioning is applied to a current picture. The image/video information may include tile-related information and slice-related information. For example, the image/video information may include the tile-related information and the slice-related information based on a case in which a value of the no-picture partition flag is 0.

The no-picture partition flag may be related to whether no-picture partitioning is applied to a current picture. That is, the no-picture partition flag may indicate/represent whether no-picture partitioning is applied to a current picture.

For example, the no-picture partition flag may be expressed as a syntax element of no_pic_partition_flag. For example, the syntax element of no_pic_partition_flag may specify whether no-picture partitioning is applied to a current picture.

In addition, the image/video information may include various information according to an embodiment of the present disclosure. For example, the image/video information may include information disclosed in at least one of Tables 1, 3, 5, 7 and/or 9 described above.

The decoding apparatus derives at least one tile in a current picture based on the tile-related information (S1110). For example, the decoding apparatus may derive at least one tile in a current picture based on the tile-related information included in image/video information.

The decoding apparatus derives at least one slice in a current picture based on the slice-related information (S1120). For example, the decoding apparatus may derive at least one slice in a current picture based on the slice-related information included in image/video information.

The decoding apparatus performs decoding on the current picture based on the at least one tile and the at least one slice (S1130). The decoding apparatus may perform decoding on the current picture based on the at least one tile and the at least one slice. Decoding of the current picture may be performed, in units of tiles and/or in units of slices, based on the at least one tile and the at least one slice. In this case, the above-described intra or inter prediction method and the residual processing method may be applied.

Here, the tile-related information and the slice-related information may include various information according to an embodiment of the present disclosure.

First, the image information may include the no-picture partition flag. When a value of the no-picture partition flag is 0, the tile-related information and the slice-related information may be configured/included in the PPS. When the value of the no-picture partition flag is 1, the tile-related information and the slice-related information may not exist.

For example, the slice-related information may include the rectangular slice flag. When a value of the no-picture partition flag is 1, the rectangular slice flag may not exist. When the rectangular slice flag does not exist, a value of the rectangular slice flag may be derived as 1.

In this regard, when a value of the no-picture partition flag is 0, the number of at least one tile in a current picture is derived as 1, and a value of the rectangular slice flag is 1, the number of at least one slice in the current picture may be constrained to be derived as a value greater than 1.

Here, the number of the at least one tile in the current picture may be related to a variable of NumTilesInPic. That is, a variable of NumTilesInPic may specify the number of the at least one tile.

Also, according to the embodiment, when the number of the at least one tile is derived as a value greater than 1, the slice-related information may include the information on the number of slices and the tile index delta presence flag.

Here, the tile index delta presence flag may be configured/included in the PPS when a value of the information on the number of slices is greater than 0.

When the number of the at least one tile is derived as 1, the information on the number of slices and the tile index delta presence flag may not exist.

For example, when the information on the number of slices does not exist, a value of the information on the number of slices may be derived as 1. That is, when a value of the no-picture partition flag is 0, the number of the at least one tile is derived as 1, and the information on the number of slices does not exist, a value of the information on the number of slices may be derived as 1.

For example, when the value of the information on the number of slices is derived, a value resulting from subtracting 1 from the number of the at least one slice may be set equal to the value of the information on the number of slices. That is, a value resulting from subtracting 1 from the number of the at least one slice may be set equal to the value of the information on the number of slices.

Here, the number of the at least one slice may be related to a variable of NumSlicesInPicMinus1. That is, the variable of NumSlicesInPicMinus1 may specify a value resulting from subtracting 1 from the number of the at least one slice in the current picture. For example, the variable of Num-SlicesInPicMinus1 may be set equal to the value of the information on the number of slices.

In this regard, the number of slices in a tile including the first slice in the current picture may be derived based on the slice-related information. Here, the number of slices in a tile including the first slice in the current picture may be related to a variable of NumSlicesInTile[0]. That is, the variable of NumSlicesInTile[i] may specify the number of slices in a tile including the i-th slice in the current picture.

For example, when a value of the no-picture partition flag is 0, the number of the at least one tile is derived as 1, and a value of the rectangular slice flag is 1, a value resulting from subtracting 1 from the number of the at least one slice may be set equal to a value resulting from subtracting 1 from the number of slices in a tile including the first slice in a current picture. That is, when the value of the no-picture partition flag is 0, the number of the at least one tile is derived as 1, and the value of the rectangular slice flag is 1, the variable of NumSlicesInPicMinus1 may be set equal to a value resulting from subtracting 1 from the variable of NumSlicesInTile[0].

For example, when the tile index delta presence flag does not exist, the value of the tile index delta presence flag may be derived as 0.

According to another embodiment proposed in the present disclosure, for example, the tile-related information may include a single tile picture flag. When the value of the no-picture partition flag is 1, the single tile picture flag may not exist. When the single tile picture flag does not exist, a value of the single tile picture flag may be derived as 0.

The single tile picture flag may be related to whether the current picture is composed of only one tile (single tile). That is, the single tile picture flag may indicate/represent whether the current picture is composed of only one tile.

For example, the single tile picture flag may be expressed as a syntax element of single_tile_per_pic_flag. For example, the syntax element of single_tile_per_pic_flag may specify whether the current picture is composed of only one tile.

For example, when the value of the single tile picture flag is 1, the tile-related information may further include information on the number of slices in a single tile and height information of each of slices in a single tile. When the value of the single tile picture flag is 0, the information on the number of slices in the single tile and the height information of each of slices in the single tile may not exist.

The information on the number of slices in the single tile may be related to the number of rectangular slices in the current picture. That is, a value resulting from adding 1 to a value of the information on the number of slices in the single tile may indicate/represent the number of rectangular slices in the current picture.

For example, the information on the number of slices in the single tile may be expressed as a syntax element of num_slices_in_single_tile_minus1. For example, a value resulting from adding 1 to a value of num_slices_in_single_tile_minus1 may specify the number of rectangular slices in the current picture.

The height information of each of slices in the single tile may be configured/included in the PPS when a value of the information on the number of slices in the single tile is greater than 0.

The height information of each of slices in the single tile may be related to a height of each of rectangular slices in the current picture. For example, the height information of each of the slices in the single tile may be related to a height of each of rectangular slices in the current picture in units of CTU rows. That is, a value resulting from adding 1 to a value of the height information of each of slices in the single tile may indicate/represent a height of each of rectangular slices in the current picture. For example, a value resulting from adding 1 to a value of the height information of each of slices in the single tile may indicate/represent a height of each of rectangular slices in the current picture in units of CTU rows.

For example, the height information of each of slices in the single tile may be expressed as a syntax element of exp_slice_height_in_single_tile_minus1. For example, a value resulting from adding 1 to a value of exp_slice_height_in_single_tile_minus1 may specify a height of each of rectangular slices in the current picture.

For example, when the value of the single tile picture flag is 0, the information on the number of tile columns, the information on the number of tile rows, the tile column width information according to the information on the number of tile columns, the tile row height information according to the information on the number of tile rows, the rectangular slice flag, the single slice flag, the information on the number of slices, the tile index delta presence flag, the tile-unit slice width information, the tile-unit slice height information, the information on the number of slices in the tile, the CTU-unit slice height information, the tile index delta information, and the loop filter tile boundary enable flag may be configured/included in the PPS.

When the value of the single tile picture flag is 1, the information on the number of tile columns, the information on the number of tile rows, the tile column width information according to the information on the number of tile columns, the tile row height information according to the information on the number of tile rows, the rectangular slice flag, the single slice flag, the information on the number of slices, the tile index delta presence flag, the tile-unit slice width information, the tile-unit slice height information, the information on the number of slices in the tile, the CTU-unit slice height information, the tile index delta information, and the loop filter tile boundary enable flag may not exist.

Also, according to another embodiment proposed in the present disclosure, for example, the slice-related information may include information on the number of slices in a tile. When the value of the no-picture partition flag is 1, the information on the number of slices in the tile may not exist. When the information on the number of slices in the tile does not exist, a value of the information on the number of slices in the tile may be derived as 0.

The information on the number of slices in the tile may be related to the number of rectangular slices in each tile. That is, a value resulting from adding 1 to a value of the information on the number of slices in the tile may indicate/represent the number of rectangular slices in each tile.

For example, the information on the number of slices in the tile may be expressed as a syntax element of num_slices_in_tile_minus1. For example, a value resulting from adding 1 to a value of num_slices_in_tile_minus1 may specify the number of rectangular slices in each tile.

When the information on the number of slices in the tile is derived, a variable of NumSlicesInTile related to the number of rectangular slices in the tile may be derived as a value resulting from adding 1 to a value of the information on the number of slices in the tile.

For example, when the number of rectangular slices in the tile derived by the information on the number of slices in the tile is greater than 1, the slice-related information may further include slice height information for each of rectangular slices in the tile. When the number of rectangular slices in the tile derived by the information on the number of slices in the tile is not greater than 1, slice height information for each of rectangular slices in the tile may not exist.

The slice height information for each of rectangular slices in the tile may be related to a height of each of rectangular slices in a current tile in units of CTU rows. That is, a value resulting from adding 1 to a value of the slice height information for each of rectangular slices in the tile may indicate/represent a height of each of rectangular slices in a current tile in units of CTU rows.

For example, the slice height information for each of rectangular slices in the tile may be expressed as a syntax element of exp_slice_height_in_ctus_minus1. For example, a value resulting from adding 1 to a value of exp_slice_height_in_ctus_minus1 may specify a height of each of rectangular slices in a current tile in units of CTU rows.

For example, when the number of rectangular slices in the tile derived by the information on the number of slices in the tile is 1, the slice-related information may further include a single slice tile flag and slice map index information. When the number of rectangular slices in the tile derived by the information on the number of slices in the tile is not 1, the single slice tile flag and the slice map index information may not exist.

The single slice tile flag may be related to whether only one slice exists in each tile. That is, the single slice tile flag may indicate/represent whether only one slice exists in each tile.

For example, the single slice tile flag may be expressed as a syntax element of single_slice_per_tile_flag. For example, the syntax element of single_slice_per_tile_flag may specify whether only one slice (e.g., single slice) exists in each tile.

For example, when the value of the single slice tile flag is 0, the slice-related information may include the slice map index information. When the value of the single slice tile flag is 1, the slice map index information may not exist.

The slice map index information may be related to an index of a tile for a slice. For example, the slice map index information may be related to information of a slice corresponding to each tile. The slice map index information may indicate/represent an index of a tile for a slice. For example, the slice map index information may indicate/represent information of a slice corresponding to each tile.

For example, the slice map index information may be expressed as a syntax element of tile_to_slice_map_idx. For example, the syntax element of tile_to_slice_map_idx may specify an index of a tile for a slice. For example, the syntax element of tile_to_slice_map_idx may specify information of a slice corresponding to each tile.

Also, according to another embodiment proposed in the present disclosure, for example, the tile-related information may include information on the number of tile columns, a column frequency information presence flag, and the tile column width information. When the value of the no-picture partition flag is 1, the information on the number of tile columns, the column frequency information presence flag, and the tile column width information may not exist. When the information on the number of tile columns does not exist, a value of the information on the number of tile columns may be derived as 0.

The information on the number of tile columns may be related to the unique number of widths of consecutive tile columns. That is, a value resulting from adding 1 to a value of the information on the number of tile columns may indicate/represent the unique number of widths of consecutive tile columns.

For example, the information on the number of tile columns may be expressed as a syntax element of num_exp_tile_columns_minus1. For example, a value resulting from adding 1 to a value of num_exp_tile_columns_minus1 may specify the unique number of widths of tile columns.

The column frequency information presence flag may be related to whether the column frequency information is signaled. That is, the column frequency information presence flag may indicate/represent whether the column frequency information is signaled.

For example, the column frequency information presence flag may be expressed as a syntax element of is_column_freq_information_present_flag. For example, the syntax element of is_column_freq_information_present_flag may specify whether to signal the column frequency information (e.g., syntax element of column_freq_count_minus1).

For example, when the value of the column frequency information presence flag is 1, the tile-related information may further include the above-described column frequency information. When the value of the column frequency information presence flag is 0, the column frequency information may not exist.

The column frequency information may be related to a frequency for a width of each of tile columns according to the unique number of widths of consecutive tile columns. That is, a value resulting from adding 1 to a value of the column frequency information may indicate/represent a frequency for a width of each of tile columns according to the unique number of widths of consecutive tile columns.

For example, the column frequency information may be expressed as a syntax element of column_freq_count_minus1. For example, a value resulting from adding 1 to a value of column_freq_count_minus1 may specify a frequency for a width of each of tile columns according to the unique number of widths of consecutive tile columns.

Also, for example, the tile-related information may include information on the number of tile rows, a row frequency information presence flag, and the tile row height information. When the value of the no-picture partition flag is 1, the information on the number of tile rows, the row frequency information presence flag, and the tile row height information may not exist. When the information on the number of tile rows does not exist, a value of the information on the number of tile rows may be derived as 0.

The information on the number of tile rows may be related to the unique number of heights of consecutive tile rows. That is, a value resulting from adding 1 to a value of the information on the number of tile rows may indicate/represent the unique number of heights of consecutive tile rows.

For example, the information on the number of tile rows may be expressed as a syntax element of num_exp_tile_rows_minus1. For example, a value resulting from adding 1 to a value of num_exp_tile_rows_minus1 may specify the unique number of heights of tile rows.

The row frequency information presence flag may be related to whether the row frequency information is signaled. That is, the row frequency information presence flag may indicate/represent whether the row frequency information is signaled.

For example, the row frequency information presence flag may be expressed as a syntax element of is_row_freq_information_present_flag. For example, the syntax element of is_row_freq_information_present_flag may specify whether to signal the row frequency information (e.g., syntax element of row_freq_count_minus1).

For example, when the value of the row frequency information presence flag is 1, the tile-related information may further include the above-described row frequency information. When the value of the row frequency information presence flag is 0, the row frequency information may not exist.

The row frequency information may be related to a frequency for a height of each of tile rows according to the unique number of heights of consecutive tile rows. That is, a value resulting from adding 1 to a value of the row frequency information may indicate/represent the frequency for the height of each of tile rows according to the unique number of heights of consecutive tile rows.

For example, the row frequency information may be expressed as a syntax element of row_freq_count_minus1. For example, a value resulting from adding 1 to a value of row_freq_count_minus1 may specify the frequency for the height of each of tile rows according to the unique number of heights of consecutive tile rows.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information (e.g., information on instructions) for implementation or an algorithm may be stored in a digital storage medium.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an over the top (OTT) video device, an Internet streaming service providing device, a three-dimensional (3D) video device, a virtual reality (VR) device, an argumente reality (AR) device, a video telephony video device, a transportation terminal (e.g., vehicle (including autonomous vehicle) terminal, airplane terminal, ship terminal, etc.), and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network.

Additionally, the embodiments of the present disclosure may be embodied as a computer program product by program codes, and the program codes may be executed on a computer by the embodiments of the present disclosure. The program codes may be stored on a computer-readable carrier.

FIG. 13 illustrates an example of a content streaming system to which embodiments disclosed in the present disclosure is applicable.

Referring to FIG. 13, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted.

The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD), a digital TV, a desktop computer, a digital signage or the like.

Each of servers in the contents streaming system may be operated as a distributed server, and in this case, data received by each server may be processed in distributed manner.

The claims described herein may be combined in various ways. For example, the technical features of the method claims of the present specification may be combined to be implemented as an apparatus, and the technical features of the apparatus claims of the present specification may be combined to be implemented as a method. In addition, the technical features of the method claims of the present specification and the technical features of the apparatus claims may be combined to be implemented as an apparatus, and the technical features of the method claims of the present specification and the technical features of the apparatus claims may be combined to be implemented as a method.

The invention claimed is:

1. An apparatus comprising:
a memory; and
at least one processor coupled with the memory, the at least one processor configured to:
obtain image information through a bitstream, wherein the image information includes a no-picture partition flag related to no-picture partitioning, and wherein based on a value of the no-picture partition flag being 0, the image information further includes information related to tile and information related to slice;
derive at least one tile in a current picture based on the information related to tile;
derive at least one slice in the current picture based on the information related to slice; and
decode the current picture based on the at least one tile and the at least one slice,
wherein the information related to slice includes a rectangular slice flag, and the rectangular slice flag is related to whether tiles within a slice cover a rectangular region of the current picture,
wherein based on the value of the no-picture partition flag being 0, a number of the at least one tile being derived as 1 and a value of the rectangular slice flag being 1, a number of the at least one slice is limited to be greater than 1.

2. The apparatus of claim 1,
wherein based on the number of the at least one tile being derived as a value greater than 1, the information related to slice includes information on a number of slices and a tile index delta present flag,
wherein a value of the information on the number of slices plus 1 is related to a number of rectangular slices in the current picture, and wherein the tile index delta present flag is related to whether a difference value between tile indexes containing a first CTU (Coding Tree Unit) of two slices is signaled.

3. The apparatus of claim 2,
wherein based on the value of the no-picture partition flag being 0, the number of the at least one tile being derived as 1 and the information on the number of slices not being present, a value of the information on the number of slices is derived as 1.

4. The apparatus of claim 2,
wherein based on the value of the no-picture partition flag being 0, the number of the at least one tile being derived as 1, and the tile index delta present flag not being present, a value of the tile index delta present flag is derived as 0.

5. The apparatus of claim 2,
wherein the number of the at least one slice minus 1 is set equal to the value of the number information of the slices.

6. The apparatus of claim 1, wherein the at least one processor is further configured to derive a number of slices in tile containing a 0-th slice in the current picture,
wherein based on the value of the no-picture partition flag being 0, a number of the at least one tile being derived as 1 and a value of the rectangular slice flag being 1, the number of the at least one slice minus 1 is set equal to the number of slices in tile containing the 0-th slice in the current picture.

7. The apparatus of claim 1,
wherein the information related to tile includes a single tile per picture flag related to whether the current picture consists of a single tile, and
wherein based on a value of the single tile per picture flag being 1, the information related to tile further includes information on a number of slices in the single tile and height information of each of the slices in the single tile.

8. The apparatus of claim 1,
wherein the information related to slice includes information on a number of slices in tile related to a number of rectangular slices in tile for each of the at least one tile,
wherein based on a number of slices in tile derived by the information on the number of slices in tile being greater than 1, the information related to slice further includes slice height information for each of the rectangular slices in tile,
wherein based on the number of slices in tile derived by the information on the number of slices in tile being 1, the information related to slice further includes a single slice per tile flag and slice map index information, and
wherein the single tile per slice flag is related to whether a single tile is present in a slice, and the slice map index information is related to an index of tile to slice.

9. The apparatus of claim 8,
based on a value of the single slice per tile flag being 0, the information related to slice includes the slice map index information.

10. The apparatus of claim 1,
wherein the information related to tile includes information on a number of tile columns related to a unique number of widths of consecutive tile columns, and a column frequency information present flag related to whether or not a column frequency information is signaled, wherein the column frequency information is related to a frequency of a width of each tile columns based on the unique number of the widths of consecutive tile columns, and wherein based on a value of the column frequency information present flag being 1, the information related to tile further includes the column frequency information.

11. The apparatus of claim 1, wherein the information related to tile includes information on a number of tile rows related to a unique number of heights of consecutive tile rows, and a row frequency information present flag related to whether or not a row frequency information is signaled, wherein the row frequency information is related to a frequency of a height of each tile rows based on the unique number of the widths of consecutive tile rows, and wherein based on a value of the row frequency information present flag being 1, the information related to tile further includes the row frequency information.

12. An apparatus comprising:

a memory; and at least one processor coupled with the memory, the at least one processor configured to:

derive at least one tile and at least one slice in a current picture;

generate information related to tile, information related to slice and a no-picture partition flag related to no-picture partitioning based on the at least one tile and the at least one slice; and encode image information including the information related to tile, the information related to slice and the no-picture partition flag, wherein the information related to slice includes a rectangular slice flag, and the rectangular slice flag is related to whether tiles within a slice cover a rectangular region of the current picture, wherein based on a value of the no-picture partition flag being 0, a number of the at least one tile being derived as 1, and a value of the rectangular slice flag being 1, a number of the at least one slice is limited to be greater than 1.

13. The apparatus of claim 12, wherein based on the number of the at least one tile being derived as a value greater than 1, the information related to slice includes information on a number of slices and a tile index delta present flag, wherein a value of the information on the number of slices plus 1 is related to a number of rectangular slices in the current picture, and wherein the tile index delta present flag is related to whether a difference value between tile indexes containing a first CTU (Coding Tree Unit) of two slices is signaled.

14. The apparatus of claim 13, wherein based on the value of the no-picture partition flag being 0, the number of the at least one tile being derived as 1 and the tile index delta present flag not being present, a value of the tile index delta present flag is derived as 0.

15. An apparatus comprising:

at least one processor configured to obtain a bitstream for image information; and a transmitter configured to transmit the data comprising the bitstream, wherein the at least one processor is configured to:

derive at least one tile and at least one slice in a current picture;

generate information related to tile, information related to slice and a no picture partition flag related to no-picture partitioning based on the at least one tile and the at least one slice; and encode the image information including the information related to tile, the information related to slice and the no-picture partition flag, wherein the information related to slice includes a rectangular slice flag, and the rectangular slice flag is related to whether tiles within a slice cover a rectangular region of the current picture, wherein based on a value of the no-picture partition flag being 0, a number of the at least one tile being derived as 1, and a value of the rectangular slice flag being 1, a number of the at least one slice is limited to be greater than 1.

* * * * *